US009809463B2

(12) United States Patent
Tomiyama et al.

(10) Patent No.: US 9,809,463 B2
(45) Date of Patent: Nov. 7, 2017

(54) DESALINATION SYSTEM AND DESALINATION METHOD

(71) Applicant: Panasonic Intellectual Property Management Co., Ltd., Osaka (JP)

(72) Inventors: Morio Tomiyama, Nara (JP); Hisaaki Gyoten, Osaka (JP); Norihisa Mino, Osaka (JP); Akira Taomoto, Kyoto (JP); Atsushi Ono, Kyoto (JP); Stephen William John, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 479 days.

(21) Appl. No.: 14/534,568

(22) Filed: Nov. 6, 2014

(65) Prior Publication Data

US 2015/0060260 A1     Mar. 5, 2015

Related U.S. Application Data

(63) Continuation of application No. PCT/JP2014/001248, filed on Mar. 6, 2014.

(30) Foreign Application Priority Data

Mar. 11, 2013   (JP) .................................. 2013-048148

(51) Int. Cl.
    *C02F 1/04*     (2006.01)
    *C02F 1/10*     (2006.01)
    (Continued)

(52) U.S. Cl.
    CPC .................. *C02F 1/04* (2013.01); *B01D 1/00* (2013.01); *B01D 5/006* (2013.01); *C02F 1/043* (2013.01);
    (Continued)

(58) Field of Classification Search
    CPC .. C02F 1/008; C02F 1/042; C02F 1/08; C02F 1/14; B01D 1/0005; B01D 1/0035;
    (Continued)

(56) References Cited

U.S. PATENT DOCUMENTS 5,270,080 A   12/1993   Mino et al.
8,652,303 B2   2/2014   Mino et al.
(Continued)

FOREIGN PATENT DOCUMENTS

| JP | 60-13206 | 1/1985 |
| JP | 7-63670 | 7/1995 |
| WO | 2012/060036 | 5/2012 |

OTHER PUBLICATIONS

International Search Report issued in International Application No. PCT/JP2014/001248 dated Apr. 8, 2014.

*Primary Examiner* — Brian McCaig
(74) *Attorney, Agent, or Firm* — Wenderoth, Lind & Ponack, L.L.P.

(57) ABSTRACT

A desalination system, etc. of the present disclosure includes: a water tank; a water-repellent particle layer that is located below the water tank and contains a plurality of water-repellent particles; a liquefying layer that is located below the water-repellent particle layer and liquefies water vapor that has passed through the water-repellent particle layer, to obtain fresh water; an introduction channel of a liquid supply channel that supplies a liquid to the water tank; and a liquid speed reduction part that is located on the introduction channel of the supply channel, and includes a wall surface crossing a flow direction of the liquid in the supply channel, for reducing a flow speed of the liquid.

14 Claims, 17 Drawing Sheets

(51) Int. Cl.
*B01D 1/00* (2006.01)
*B01D 5/00* (2006.01)
*C02F 103/08* (2006.01)

(52) U.S. Cl.
CPC ............... *C02F 1/048* (2013.01); *C02F 1/10* (2013.01); *C02F 2103/08* (2013.01); *Y02W 10/37* (2015.05)

(58) Field of Classification Search
CPC .... B01D 1/0076; B01D 1/0082; B01D 5/006; Y02W 10/37
See application file for complete search history.

(56) References Cited

U.S. PATENT DOCUMENTS

2009/0045128 A1\* 2/2009 Murray ................ B01D 29/114
 210/340
2012/0138448 A1 6/2012 Mino et al.

\* cited by examiner

DESALINATION SYSTEM AND DESALINATION METHOD

CROSS REFERENCE TO RELATED APPLICATIONS

This is a continuation application of PCT International Application No. PCT/JP2014/001248 filed on Mar. 6, 2014, designating the United States of America, which is based on and claims priority of Japanese Patent Application No. 2013-048148 filed on Mar. 11, 2013. The entire disclosures of the above-identified applications, including the specifications, drawings and claims are incorporated herein by reference in their entirety.

FIELD

One or more exemplary embodiments disclosed herein relate generally to a desalination system and a desalination method for obtaining fresh water from a liquid.

BACKGROUND

As a technique for generating fresh water at locations where such water is not easily available, the one of generating fresh water from seawater has been known. For example, Patent Literature (PTL) 1 discloses a desalinating method using water-repellent particles.

CITATION LIST

Patent Literature

[PTL 1] WO2012/060036

SUMMARY

Technical Problem

However, in the method in the background art, there is a possibility that a water-repellent particle layer may be partially eroded during the introduction of a liquid. Consequently, a portion of the water-repellent particle layer whose thickness is reduced owing to erosion may be breached, so that seawater may pass through that portion. When the water-repellent particle layer is breached, it is impossible to generate the fresh water from the seawater.

One non-limiting and exemplary embodiment provides a desalination system and a desalination method capable of alleviating the problem of desalination being impossible.

Solution to Problem

In one general aspect, the techniques disclosed here feature a desalination system including: a water tank; a water-repellent particle layer that is located below the water tank and contains a plurality of water-repellent particles; a liquefying layer that is located below the water-repellent particle layer and liquefies water vapor that has passed through the water-repellent particle layer, to obtain fresh water; an introduction channel that supplies a liquid to the water tank; and a liquid speed reduction part that is located on the introduction channel, and includes a wall surface crossing a flow direction of the liquid in the introduction channel, for reducing a flow speed of the liquid.

It should be noted that these generic aspects or specific aspects serving as a part thereof may be implemented by a system, a method, an integrated circuit, a computer program or a computer-readable recording medium such as a CD-ROM, or by an arbitrary combination of a system, a method, an integrated circuit, a computer program and a recording medium.

General and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The desalination system and the desalination method according to one or more exemplary embodiments or features disclosed herein make it possible to alleviate the problem of desalination being impossible.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

In the present description, "water repellency" means a property of rejecting water.

UNDERLYING KNOWLEDGE FORMING BASIS OF THE PRESENT DISCLOSURE

Figure 1:
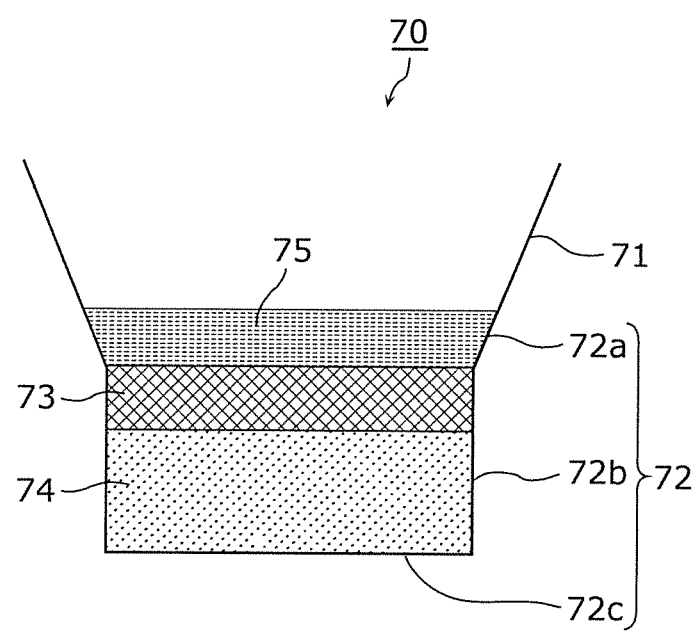
FIG. 1 is a sectional view illustrating a configuration of a desalination apparatus in a comparative example.

FIG. 1 is a sectional view illustrating a configuration of the desalination apparatus in the comparative example.

A desalination apparatus 70 in the comparative example includes a water tank 71, a water-repellent particle layer 73 and a liquefying layer 74. The water tank 71, the water-repellent particle layer 73 and the liquefying layer 74 are located in this order from above. Details of individual configurations will be described later.

In the desalination apparatus 70, the liquid stored in the water tank 71 (a liquid layer 75) is evaporated to be water vapor. The water vapor passes through the water-repellent particle layer 73. The water vapor that has passed through the water-repellent particle layer 73 is liquefied in the liquefying layer 14 so as to become water (fresh water).

The water-repellent particle layer 73 is formed of a large number of water-repellent particles that are clustered together. The surface of one water-repellent particle is in contact with the surfaces of other water-repellent particles. Each of the water-repellent particles includes a particle and a water-repellent film coating the particle surface, and has water repellency. Also, between the water-repellent particles that are in contact with each other, the water-repellent particle layer 73 has a gap through which the water vapor obtained by evaporating the liquid can pass.

The inventors have arrived at the following knowledge: in the desalination apparatus 70 described above, during the introduction of a liquid to the water tank 71, the water-repellent particles may sometimes move, so that the surface (upper surface) of the water-repellent particle layer 73 may be partially eroded. FIGS. 2A to 2I are enlarged views illustrating an example of how the surface of the water-repellent particle layer 73 is partially eroded.

<FIG. 2A>

Figure 2A:
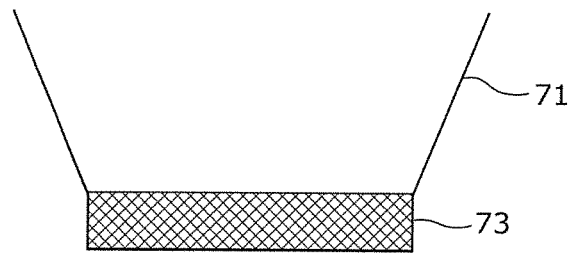
FIG. 2A is a drawing for describing an example of how a surface of a water-repellent particle layer is partially eroded.

FIG. 2A illustrates a state before the introduction of the liquid layer 75 to the water tank 71 in the comparative example. FIG. 2A is a view obtained by enlarging only a part of the water tank 71 and the water-repellent particle layer 73 in the desalination apparatus 70. The following is a description of an example in which the upper surface of the water-repellent particle layer 73 is a flat surface and the liquid layer 75 is introduced from an opening of the water tank 71 along an upper side wall 72a of the water tank 71.

<FIG. 2B>

Figure 2B:
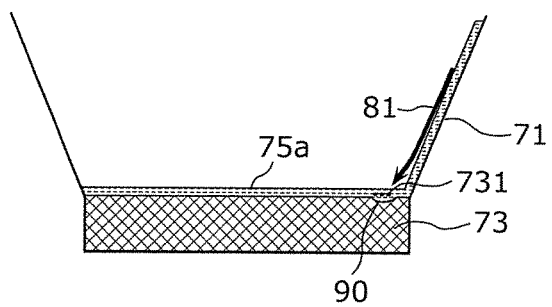
FIG. 2B is a drawing for describing an example of how the surface of the water-repellent particle layer is partially eroded.

FIG. 2B illustrates a state in which, in the state of FIG. 2A, a liquid layer 75a is introduced to the water tank 71 from the opening of the water tank 71 along the upper side wall 72a. The downward arrow indicates a flow 81 of the liquid being introduced. Inside the water tank 71, the liquid that is accumulated in the water tank 71 is illustrated.

By introducing the liquid to the water tank 71, the liquid is accumulated as the liquid layer 75a on the water-repellent particle layer 73. Furthermore, the flow 81 of the introduced liquid causes a part of the water-repellent particles (for example, water-repellent particles 731) in the water-repellent particle layer 73 to be stirred up and suspended in the liquid layer 75a.

In other words, the surface of the water-repellent particle layer 73 near the portion where the liquid has been introduced is partially eroded. The surface of the water-repellent particle layer 73 is partially eroded, so that a recessed portion 90 is formed partially on the surface of the water-repellent particle layer 73. That is to say, a plurality of the water-repellent particles including the water-repellent particles 731 located on the surface of the water-repellent particle layer 73 move, so that the recessed portion 90, which is a portion dented on the surface of the water-repellent particle layer 73, is formed. Also, the water-repellent particles 731 that were located in the portion of the water-repellent particle layer 73 where the recessed portion 90 is formed are stirred up and suspended in the liquid layer 75a.

<FIG. 2C>

Figure 2C:
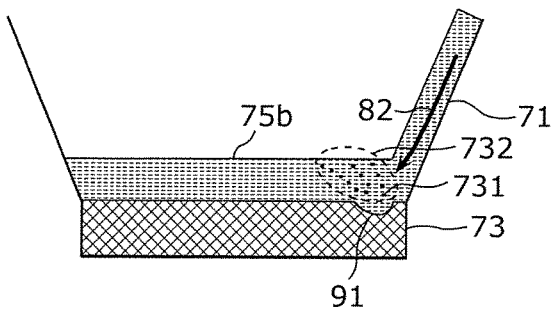
FIG. 2C is a drawing for describing an example of how the surface of the water-repellent particle layer is partially eroded.

FIG. 2C illustrates a state in which, in the state of FIG. 2B, the liquid is introduced to the water tank 71 with a still larger flow amount. A flow 82 of the introduced liquid further erodes the surface of the water-repellent particle layer 73, thus forming a recessed portion 91. With the further introduction of the liquid, the recessed portion 91 becomes deeper than the recessed portion 90. Moreover, the flow 82 of the liquid causes a water-repellent particle group 732 including the water-repellent particles 731 suspended in a liquid layer 75b to mainly move away from the recessed portion 91 within the liquid layer 75b.

<FIG. 2D>

Figure 2D:
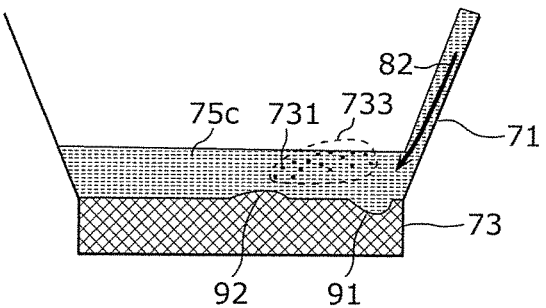
FIG. 2D is a drawing for describing an example of how the surface of the water-repellent particle layer is partially eroded.

FIG. 2D illustrates how the water-repellent particle group 733 including the water-repellent particles 731 suspended in a liquid layer 75c settles on the surface of the water-repellent particle layer 73 other than the recessed portion 91. With the settlement of the plurality of water-repellent particles, a plurality of protruding portions 92 are partially formed on the surface of the water-repellent particle layer 73 other than the recessed portion 91.

<FIG. 2E>

Figure 2E:
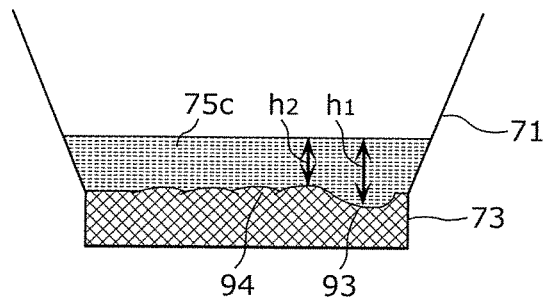
FIG. 2E is a drawing for describing an example of how the surface of the water-repellent particle layer is partially eroded.

FIG. 2E illustrates a state in which the liquid layer 75c is formed having a predetermined height (a height not exceeding water bearing pressure) with reference to the height of the surface of the water-repellent particle layer 73 before erosion. In the state illustrated in FIG. 2E, the introduction of the liquid to the water tank 71 is stopped. By introducing the liquid to the water tank 71 as illustrated in FIGS. 2C and 2D, the water-repellent particle layer 73 is partially eroded, so that a recessed portion 93 and a protruding portion 94 are formed on the surface of the water-repellent particle layer 73. In other words, the height of the upper surface of the water-repellent particle layer 73 is not uniform (the upper surface is not flat) but varies partially because recessed and protruding portions are formed. As a result, the height of the liquid layer 75c varies partially as illustrated by a height h1 of the liquid layer 75c in the recessed portion 93 and a height h2 of the liquid layer 75c in the protruding portion 94.

In other words, for example, during the introduction of the liquid, the liquid flow varies according to the variation of the height of the liquid layer 75c in the water tank 71. Accordingly, the water-repellent particles suspended in the liquid layer 75c settle individually at different positions of the water-repellent particle layer 73, thus forming a plurality of the protruding portions 94.

Thus, as illustrated in FIG. 2E, at least one recessed portion 93 and the plurality of protruding portions 94 could be formed on the surface of the water-repellent particle layer 73. It should be noted that there is no limitation to one recessed portion 93. A plurality of the recessed portions 93 also could be formed on the surface of the water-repellent particle layer 73 depending on the flow of the liquid to be introduced to the water tank 71 or the method for introducing the liquid.

<FIG. 2F>

Next, after the liquid layer 75c is formed as illustrated in FIG. 2E, the desalination apparatus 70 carries out a desalination process of obtaining fresh water by heating the liquid in the liquid layer 75c to obtain water vapor, which passes through the water-repellent particle layer 73 and turns to water in the liquefying layer 74. With the desalination process, the liquid in the liquid layer 75c turns to water vapor and moves from the liquid layer 75c, so that the height of the liquid layer 75c decreases. Thus, as illustrated in FIG. 2F, the liquid is introduced again to the water tank 71 through a flow 83, thereby maintaining the height of the liquid layer 75d.

<FIG. 2G>

Figure 2F:
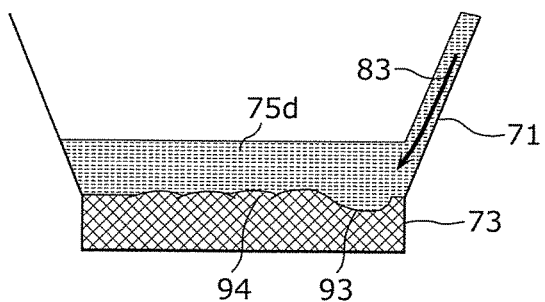
FIG. 2F is a drawing for describing an example of how the surface of the water-repellent particle layer is partially eroded.
Figure 2G:
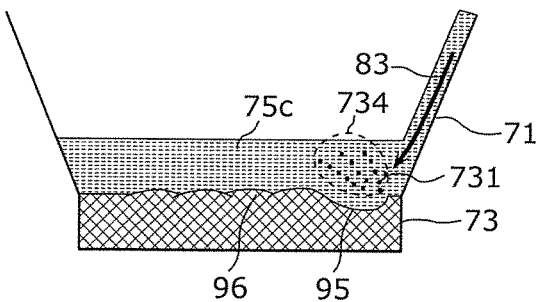
FIG. 2G is a drawing for describing an example of how the surface of the water-repellent particle layer is partially eroded.

As illustrated in FIG. 2F, the reintroduction of the liquid to the water tank 71 causes the surface of the water-repellent particle layer 73 to be partially eroded similarly to FIG. 2C. As illustrated in FIG. 2G, when the liquid is introduced to the water tank 71 from the same position as the state until FIG. 2F, a recessed portion 95 becomes deeper than the recessed portion 93. It should be noted that the flow 83 of the liquid causes a water-repellent particle group 734 including, for example, the water-repellent particles 731 suspended in the liquid layer 75c to move mainly away from the recessed portion 95 within the liquid layer 75c and, for example, settle in a protruding portion 96.

<FIG. 2H>

Figure 2H:
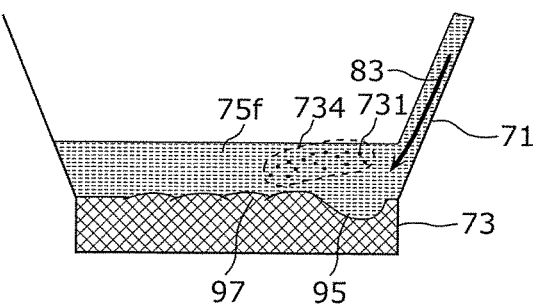
FIG. 2H is a drawing for describing an example of how the surface of the water-repellent particle layer is partially eroded.

Next, as illustrated in FIG. 2H, the water-repellent particle group 734 including the water-repellent particles 731 suspended within a liquid layer 75f settles on the surface of the water-repellent particle layer 73, so that a protruding portion 97 is formed on the surface of the water-repellent particle layer 73. Specifically, since a part of the water-repellent particle group 734 settles on the portion where the protruding portion 96 is already formed, the protruding portion 97 is higher than the protruding portion 96.

<FIG. 2I>

As illustrated in FIGS. 2A to 2H, during the formation of the liquid layer 75, the recessed portion and the plurality of protruding portions are formed on the surface of the water-repellent particle layer 73.

Figure 2I:
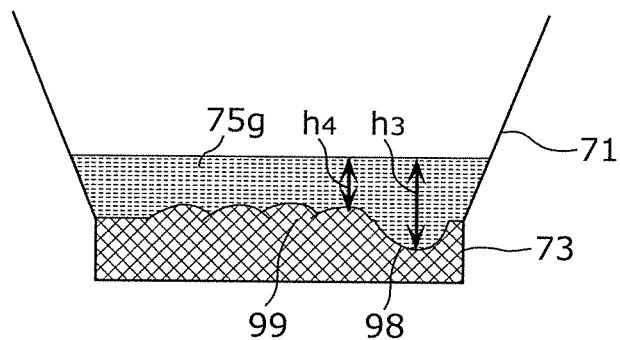
FIG. 2I is a drawing for describing an example of how the surface of the water-repellent particle layer is partially eroded.

Specifically, in FIG. 2I, h3 represents the distance between a lower surface of a recessed portion 98 (for example, the most dented portion) and an upper surface of a liquid layer 75g, and h4 represents the distance between an upper surface of a protruding portion 99 (for example, the most protruding portion) and the upper surface of the liquid layer 75g. Here, the upper surface of the liquid layer 75g (a liquid surface) may also be referred to as a "water surface." As described above, even when the upper surface of the liquid layer 75g (water surface) is the same, the distance h3 between the lower surface of the recessed portion 98 and the water surface is larger than the distance h4 between the upper surface of the protruding portion 99 and the water surface.

The pressure applied to the water-repellent particle layer 73 varies depending on the distance from the water-repellent particle layer 73 to the water surface. Accordingly, the pressure applied to the water-repellent particle layer 73 in the recessed portion 98 is different from that in the protruding portion 99 illustrated in FIG. 2I.

Thus, if the liquid is introduced to the water tank 71 without considering the formation of the recessed portion 98 and the protruding portion 99 on the surface of the water-repellent particle layer 73, the liquid in an amount exceeding the water bearing pressure is introduced in a part of the water-repellent particle layer 73. In this case, the water-repellent particle layer 73 becomes unable to hold the liquid layer 75g, so that the liquid enters the inside of the water-repellent particle layer 73 (the water-repellent particle layer 73 is breached). In the following, the water-repellent particle layer 73 becoming unable to hold the liquid is also referred to as that being "breached."

For example, if the liquid layer 75g is formed on the water-repellent particle layer 73 so as to have a predetermined height (a height not exceeding the water bearing pressure) with reference to the flat surface of the water-repellent particle layer 73 before erosion, pressure greater than or equal to the pressure acting on the referenced flat surface (pressure exceeding the water bearing pressure) is exerted on the recessed portion 98. Consequently, there is a possibility that the water-repellent particle layer 73 could be breached in the recessed portion 98.

Also, as illustrated in FIGS. 2F to 2H, even if the liquid is introduced so as to form the liquid layer 75 as thick as the liquid layer 75 before the desalination process, a portion of the water-repellent particle layer 73 is eroded, and pressure applied to that portion of the water-repellent particle layer 73 (for example, the recessed portion 98) exceeds a predetermined water bearing pressure. Thus, there is a possibility that the eroded portion of the water-repellent particle layer 73 (for example, the recessed portion 98) could be beached.

Every time the desalination process is carried out, the liquid in the liquid layer 75 is evaporated, making it necessary to introduce the liquid to the water tank 71. By introducing the liquid again after the desalination process as illustrated in FIG. 2F, the recessed portion (for example, the recessed portion 93) is increasingly deeper. In other words, the distance h3 between the lower surface of the recessed portion 98 and the upper surface of the liquid layer 75g illustrated in FIG. 2I continues increasing unless the water-repellent particles are supplied to the recessed portion 98 of the water-repellent particle layer 73 for repairing.

The water bearing pressure of the water-repellent particle layer 73 is determined by the height from the surface of the water-repellent particle layer 73 to the upper surface of the liquid layer 75 as described above. Accordingly, the deepening of the eroded portion (recessed portion) of the water-repellent particle layer 73 may cause the water-repellent particle layer 73 to be breached unless the height of the liquid layer 75 is adjusted to be smaller.

As described above, in the desalination apparatus in the comparative example, the inventors have found that the water-repellent particle layer 73 formed of the plurality of water-repellent particles has a layer structure that is more easily deformed by the movement of the water-repellent particles due to an applied force, compared with a particle layer formed of a plurality of hydrophilic particles.

In the water-repellent particle layer 73 formed of the plurality of water-repellent particles, the adjacent particles are bound to each other more weakly than those in the particle layer formed of the plurality of hydrophilic particles. Adjacent hydrophilic particles are usually bound to one another via a water molecule. In contrast, adjacent water-repellent particles are merely in contact with one another, and easily movable by an applied force. Thus, when a force is applied to a portion of the water-repellent particle layer 73, the water-repellent particles subjected to the force move, whereas the other water-repellent particles subjected to no force do not move. Consequently, the water-repellent particle layer 73 is easily deformed.

Here, the amount of the liquid that can be held above the upper surface of the water-repellent particle layer 73 is determined by the water bearing pressure, which depends on the height of the liquid surface from the surface (upper surface) of the water-repellent particle layer 73. When the liquid in an amount exceeding the predetermined water bearing pressure of the water-repellent particle layer 73 is placed (formed) above the water-repellent particle layer 73, the liquid passes through the water-repellent particle layer 73. In other words, the water-repellent particle layer 73 becomes unable to hold the liquid any more and lets the liquid pass therethrough. When the liquid layer 75 is formed above the water-repellent particle layer 73, it is appropriate to suppress the deformation of the water-repellent particle layer 73 because the surface deformation of the water-repellent particle layer 73 brings about the change in height of the water surface from the surface of the water-repellent particle layer 73.

In view of the above, the inventors have come to an inventive concept that can suppress the movement of the water-repellent particles for the purpose of preventing the water-repellent particle layer 73 from being breached.

With the foregoing in mind, it is an object of one aspect of the present disclosure to provide a desalination system and a desalination method capable of alleviating the problem of desalination being impossible.

According to an exemplary embodiment disclosed herein, a desalination system includes: a water tank; a water-repellent particle layer that is located below the water tank and contains a plurality of water-repellent particles; a liquefying layer that is located below the water-repellent particle layer and liquefies water vapor that has passed through the water-repellent particle layer, to obtain the fresh water; a liquid introduction channel that supplies the liquid to the water tank; and a liquid speed reduction part that is located on the introduction channel, and includes a wall surface crossing a flow direction of the liquid in the introduction channel, for reducing a flow speed of the liquid.

With this configuration, the liquid can be introduced at a gentle flow speed to a vicinity of a portion immediately below the water tank connected with the introduction channel (a liquid introduction position), making it possible to suppress the erosion of the water-repellent particle layer. Thus, the problem of desalination being impossible can be alleviated.

Here, for example, the wall surface may be of a sufficient width to span an entire channel width of the introduction channel.

Also, for example, the above-described desalination system may further include a pool tank located in the introduction channel between the water tank and the liquid speed reduction part, the pool tank having an opening that spans a channel width of the introduction channel, and a space in which the liquid introduced via the opening is accumulated and from which an overflow of the liquid is discharged to the introduction channel.

With this configuration, the liquid can be introduced at a gentle flow speed to the vicinity of a portion immediately below the water tank connected with the introduction channel (the liquid introduction position). This makes it possible to suppress the erosion of the water-repellent particle layer.

Furthermore, for example, the above-described desalination system may further include a pool tank located upstream of the liquid speed reduction part in the introduction channel, the pool tank having an opening that spans a channel width of the introduction channel, and a space in which the liquid introduced via the opening is accumulated and from which an overflow of the liquid is discharged to the introduction channel.

With this configuration, the liquid can be introduced at a gentle flow speed to the vicinity of a portion immediately below the water tank connected with the introduction channel (the liquid introduction position) This makes it possible to suppress the erosion of the water-repellent particle layer.

Here, for example, the introduction channel may have at least a predetermined distance between the water tank and the liquid speed reduction part.

Also, for example, the liquid speed reduction part may have a semi-cylindrical shape, or a rectangular parallelepiped shape.

Additionally, for example, the liquid speed reduction part may have a triangular prismatic shape having different base angles, and one of the base angles that is closer to the desalination apparatus may be smaller than an other on an opposite side of the desalination apparatus.

This makes it possible to supply the liquid in a planar manner to the introduction channel, so that the effect of suppressing the erosion of the water-repellent particle layer can be enhanced.

Moreover, for example, the above-described desalination system may further include a supply port that supplies the liquid from outside of the desalination apparatus to the introduction channel, and the supply port may have a slit shape.

This makes it possible to supply the liquid in a planar manner to the introduction channel, so that the effect of suppressing the erosion of the water-repellent particle layer can be enhanced.

Furthermore, for example, the above-described desalination system may further include a supply port that supplies the liquid from outside of the desalination apparatus to the introduction channel, and the supply port may include a plurality of openings.

This makes it possible to supply the liquid in a planar manner to the introduction channel, so that the effect of suppressing the erosion of the water-repellent particle layer can be enhanced.

Also, for example, the water tank may be connected with the introduction channel, and provided with a discharge channel through which the liquid is discharged partially, the discharge channel being located at a position opposed to the introduction channel with the water tank interposed between the introduction channel and the discharge channel, and the water-repellent particle layer may have an inclined upper surface descending from the introduction channel toward the discharge channel with respect to a plane perpendicular to a gravitational direction.

This allows the liquid in the water tank to be discharged while gently flowing, for example, from the introduction channel toward a discharge port, so that the liquid in the water tank can be made to flow constantly to prevent precipitates from staying on the water-repellent particle layer. This helps to suppress the reduction in a distillation efficiency.

For example, the water-repellent particle layer may have an inclined lower surface descending from the introduction channel toward the discharge channel with respect to the plane perpendicular to the gravitational direction.

In this way, the liquid in the water tank can be made to flow constantly to prevent the precipitates from staying on the water-repellent particle layer, making it possible to suppress the reduction in the distillation efficiency.

Also, for example, the above-described desalination system further may include a sluice gate that is opened and closed to start and stop introducing the liquid from outside of the desalination apparatus to the introduction channel.

This makes it possible to regulate an amount of water to be introduced (a water flow), so that the breach of the water-repellent particle layer 13 caused by the water flow can be suppressed.

Furthermore, according to an exemplary embodiment disclosed herein, a desalination system includes: a water tank; a water-repellent particle layer that is located below the water tank and contains a plurality of water-repellent particles; a liquefying layer that is located below the water-repellent particle layer and liquefies water vapor that has passed through the water-repellent particle layer, to obtain the fresh water; a liquid introduction channel that introduces the liquid to the water tank; and a pool tank having an opening that spans a channel width of the introduction channel, and a space in which the liquid introduced via the opening is accumulated and from which an overflow of the liquid is discharged to the introduction channel.

With this configuration, the liquid can be introduced at a gentle flow speed to the vicinity of a portion immediately below the water tank connected with the introduction channel (the liquid introduction position). This makes it possible to suppress the erosion of the water-repellent particle layer.

Moreover, according to an exemplary embodiment disclosed herein, a desalination method is a desalination method for obtaining fresh water from a liquid using a desalination system, the desalination system including: a water tank to which the liquid is introduced; a water-repellent particle layer that is located below the water tank and contains a plurality of water-repellent particles; a liquefying layer that is located below the water-repellent particle layer; a liquid introduction channel that introduces the liquid to the water tank; and a liquid speed reduction part that is located on the introduction channel, and includes a wall surface crossing a flow direction of the liquid in the introduction channel, for reducing a flow speed of the liquid. The desalination method includes: introducing the liquid via the introduction channel to the water tank and placing the liquid above the water-repellent particle layer; heating and evaporating the liquid placed above the water-repellent particle layer to obtain water vapor; and liquefying the water vapor by the liquefying layer to obtain the fresh water.

It should be noted that these generic aspects or specific aspects serving as a part thereof may be implemented by a system, a method, an integrated circuit, a computer program or a computer-readable recording medium such as a CD-ROM, or by an arbitrary combination of a system, a method, an integrated circuit, a computer program and a recording medium.

The following is a specific description of each embodiment, with reference to the accompanying drawings.

It should be noted that any embodiment described below will illustrate a generic or specific example. The numerical values, shapes, materials, structural components, the arrangement and connection of the structural components, steps and the order of the steps mentioned in the following embodiment are merely an example and not intended to limit the present disclosure. Further, among the structural components in the following embodiment, the one that is not recited in any independent claim exhibiting the most generic concept will be described as an arbitrary structural component.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

Desalination Apparatus

Figure 3:
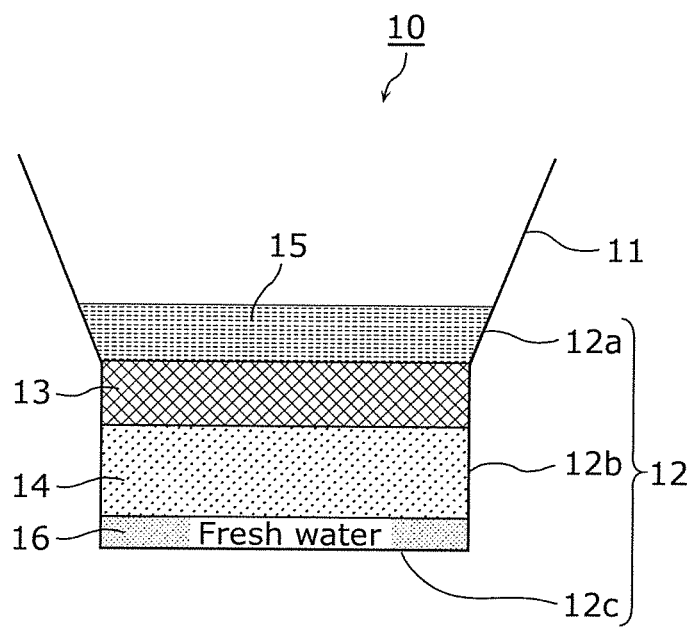
FIG. 3 illustrates an exemplary configuration of a desalination apparatus with a basic configuration.

The following describes a desalination apparatus 10 with a basic configuration and a desalination process thereof with reference to the drawings before describing a desalination system according to an embodiment. FIG. 3 is a sectional view illustrating a configuration of the desalination apparatus 10.

The desalination apparatus 10 shown in FIG. 3 includes a water tank 11, a water-repellent particle layer 13 and a liquefying layer 14. The water tank 11, the water-repellent particle layer 13 and the liquefying layer 14 are located in this order from above. Here, the water tank 11 has a lateral surface surrounded by an upper side wall 12a of a vessel 12 and a bottom surface covered with the water-repellent particle layer 13, such that a space for storing a liquid (a reservoir layer) is defined therein.

<Water Tank 11>

The water tank 11 may have any shape such as a rectangle or a circle when seen from a plan view (a top view). The lateral surface of the water tank 11 is formed of the upper side wall 12a of the vessel 12, and the bottom surface thereof is formed of an upper surface of the water-repellent particle layer 13.

Here, the vessel 12 will be described. The vessel 12 shown in FIG. 3 includes a lower side wall 12b that extends vertically, the upper side wall 12a that is connected to the lower side wall 12b and inclined so as to expand upwardly, and a base plate 12c that is connected to the lower side wall 12b. The upper side wall 12a is not necessarily inclined so as to expand upwardly, but may extend vertically similarly to the lower side wall 12b. However, since the upper side wall 12a sometimes corresponds to a flow channel of a liquid when the liquid is introduced to the water tank 11 as described in FIGS. 2A to 2I, it is favorable that the upper side wall 12a be inclined so as to expand upwardly in order to reduce energy of the liquid to be introduced to the water tank 11.

The vessel 12 is formed such that the upper side wall 12a, the lower side wall 12b and the base plate 12c surround surfaces other than an upper surface of the water tank 11.

In a lower portion of the vessel 12, lateral portions of the water-repellent particle layer 13 and the liquefying layer 14 described later are entirely surrounded by the lower side wall 12b, and a bottom surface of the liquefying layer 14 is held by the base plate 12c. The vessel 12 allows fresh water obtained by desalination to be held in the liquefying layer 14.

Each of the lower side wall 12b and the upper side wall 12a is formed of a water repellent material. An exemplary material for each of the lower side wall 12b and the upper side wall 12a is a metal sheet, concrete, a waterproof sheet or clay.

As described above, the vessel 12 has a shape of a bottomed tube, includes the upper side wall 12a that has a tubular shape whose upper opening is larger than its lower opening, the lower side wall 12b that has a tubular shape whose upper opening contacts the lower opening of the upper side wall 12a, and the base plate 12c that closes a lower opening of the lower side wall 12b, and receives the water tank 11, the water-repellent particle layer 13 and the liquefying layer 14 therein. Incidentally, the vessel 12 is not limited to the shape of a bottomed tube, but may be provided, for example, as a recessed portion dug in the ground, in which the water tank 11, the water-repellent particle layer 13 and the liquefying layer 14 are located. Also, the lower side wall 12b and the upper side wall 12a are not limited to have a water repellency but may have a water proof property.

The liquid poured (introduced) into the water tank 11 forms the liquid layer 15 in the water tank 11. In other words, the liquid forms the liquid layer 15 above the upper surface of the water-repellent particle layer 13 and inside the vessel 12 (a space surrounded by the upper side wall 12a).

It is noted that the desalination apparatus 10 may have an introduction passage for introducing the liquid to the water tank 11. On the other hand, when the desalination apparatus 10 does not have the introduction passage, the liquid may be introduced into the water tank 11 from an opening of the water tank 11 (an opening of the vessel 12). Here, the liquid to be introduced to the water tank 11 is transparent or translucent, for example.

The liquid that has been poured into the water tank 11 and formed the liquid layer 15 does not fall down to the liquefying layer 14 because the water-repellent particle layer 13 and the upper side wall 12a have water repellency. In other words, the liquid that has been poured into the water tank 11 is overlaid on the upper surface of the water-repellent particle layer 13 whose perimeter is surrounded by the upper side wall 12a, and maintained as the liquid layer 15. The height of the liquid layer 15 (a liquid level of the liquid layer 15) is, for example, 15 cm to 50 cm. When the height of the liquid layer 15 is too great (for example, larger than 50 cm), it takes time to heat the liquid as described later. Thus, a great amount of heat capacity is needed, resulting in decreased efficiency of desalinating the liquid. On the other hand, when the height of the liquid layer 15 is too small (for example, smaller than 15 cm), the efficiency of desalinating the liquid is excessively reduced. Accordingly, the height of the liquid layer 15 within the above-noted numerical range makes it possible to keep an appropriate desalination efficiency.

As described above, the lateral surface of the water tank 11 is formed of the upper side wall 12a of the vessel, and the bottom surface thereof is formed of the water-repellent particle layer 13. The water tank 11 holds as the liquid layer 15 the liquid that has been introduced from an outside of the desalination apparatus 10.

It should be noted that the water tank 11 may include a heater for heating the liquid layer 15 in the water tank 11. In this case, the heater is disposed on the upper side wall 12a of the water tank 11, for example.

<Water-Repellent Particle Layer 13>

The water-repellent particle layer 13 is located below the water tank 11. The upper surface of the water-repellent particle layer 13 forms the bottom surface of the water tank 11. When the liquid is poured into the water tank 11, the water-repellent particle layer 13 is located in contact with the lower surface of the liquid layer 15. As shown in FIG. 3, a lateral surface of the water-repellent particle layer 13 may be surrounded by the lower side wall 12b.

The water-repellent particle layer 13 contains at least a plurality of water-repellent particles. Each of the water-repellent particles includes a particle and a water-repellent film that coats a particle surface. The water-repellent particles are particles whose surfaces have water repellency.

The water-repellent particle layer 13 is formed of a large number of the water-repellent particles that are clustered together. In other words, the surface of one water-repellent particle is in contact with the surfaces of other water-repellent particles. At this time, between the water-repellent particles that are in contact with each other, the water-repellent particle layer 13 has a gap through which the water vapor obtained by heating and evaporating the liquid can pass. Since the water-repellent particle layer 13 includes the plurality of water-repellent particles, it is possible to reduce the liquid entering the inside of the water-repellent particle layer 13.

The lower side wall 12b may surround the lateral surface of the water-repellent particle layer 13 entirely. By doing so, it becomes possible to reduce the liquid entering the inside of the water-repellent particle layer 13. Since the plurality of water-repellent particles forming the water-repellent particle layer 13 have water repellency and thus can reduce the liquid entering the inside of the water-repellent particle layer 13, it is not essential to provide the lower side wall 12b.

The particles include gravel, sand, silt and clay. The gravel corresponds to particles having a particle size of greater than 2 mm and not greater than 75 mm. The sand corresponds to particles having a particle size of greater than 0.075 mm and not greater than 2 mm. The silt corresponds to particles having a particle size of greater than 0.005 mm and not greater than 0.075 mm. The clay corresponds to particles having a particle size of not greater than 0.005 mm.

The water-repellent film coats the surface of each of the particles. The water-repellent film may include a fluorocarbon group represented by the chemical formula —$(CF_2)_n$—. Here, n is a natural number. For example, n ranges from 2 to 20.

The water-repellent film may be bound to the particle by a covalent bond. The following chemical formula (I) represents a favorable water-repellent film.

[Formula 1]

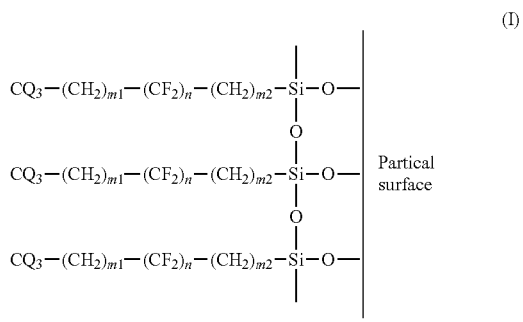

(I)

Here, Q represents hydrogen or fluorine. m1 and m2 represent zero or a natural number of not less than one, independently. Further, n ranges from 2 to 20.

In the following, an exemplary method for producing the water-repellent particles will be described.

First, a surfactant represented by the chemical formula $CX_3$—$(CH_2)_{m1}$—$(CF_2)_n$—$(CH_2)_{m2}$—$SiX_3$ is dissolved in a non-aqueous solvent to prepare a surfactant solution. X is halogen, optionally, chlorine.

Next, a plurality of particles are immersed in the surfactant solution in dry atmosphere to obtain a plurality of water-repellent particles (see Patent Literature: U.S. Pat. No. 5,270,080 (corresponding to Japanese Examined Patent Application Publication No. 07-063670)).

Furthermore, examples of the material for the water-repellent film include chlorosilane materials or alkoxysilane materials. The chlorosilane materials are, for example, heptadecafluoro-1,1,2,2-tetrahydrodecyltrichlorosilane or n-octadecyldimethylchlorosilane. The alkoxysilane materials are, for example, n-octadecyltrimethoxysilane or nonafluorohexyltriethoxysilane.

The water-repellent particle layer 13 may have low thermal conductivity so that heat conduction between the water tank 11 and the liquefying layer 14 is reduced. In the water tank 11, the liquid is heated and evaporated. Accordingly, the water tank 11 is kept at a predetermined temperature or higher (for example, from 40° C. to 60° C.). The liquefying layer 14 liquefies the water vapor. Accordingly, the liquefying layer 14 is kept at a predetermined temperature or lower (for example, 15° C. or lower). When the difference in temperature between the water tank 11 and the liquefying layer 14 is considerable and the thermal conductivity therebetween is high, the desalination efficiency may be reduced in some cases.

Since the water-repellent particle layer 13 is formed of the plurality of water-repellent particles that are clustered together, air is present between the plurality of particles. Thus, the water-repellent particle layer 13 has lower thermal conductivity than a film or the like formed of a uniform material.

The thickness of the water-repellent particle layer 13 is, for example, from 1 cm to 30 cm.

When the water-repellent particle layer 13 is too thin (e.g., has a thickness of less than 1 cm), there is a possibility that the water poured in the water tank 11 may fall down to the liquefying layer 14. On the other hand, the water-repellent particle layer 13 is too thick (e.g., has a thickness of greater than 30 cm), the water vapor described later cannot easily pass through the gap between particles in the water-repellent particle layer 13.

<Liquefying Layer 14>

The liquefying layer 14 is located below the water-repellent particle layer 13. The liquefying layer 14 may be formed of a plurality of particles including particles that have not been treated to be water repellent. Alternatively, the liquefying layer 14 may be a space surrounded by the lower side wall 12b and the base plate 12c.

The lateral portion of the liquefying layer 14 may be entirely surrounded by the lower side wall 12b and the bottom portion thereof may be covered with the base plate 12c, so that the vessel 12 can hold fresh water 16.

The water vapor that has left the water-repellent particle layer 13 and reached the liquefying layer 14 after passing through the gap between the particles in the water-repellent particle layer 13 is liquefied in the liquefying layer 14 to become liquid water (fresh water 16). Details will be described later.

The liquefying layer 14 is cooled as necessary.

An exemplary cooling method is illustrated as follows. The liquefying layer 14 is cooled by placing at least a part of the liquefying layer 14 in the soil (in the ground). For example, the height of the interface between the liquefying layer 14 and the water-repellent particle layer 13 is brought to the same level as the earth's surface, thereby making the temperature of the liquefying layer 14 lower than that of the water-repellent particle layer 13.

Also, the liquefying layer 14 may include a cooling unit.

As described above, the liquefying layer 14 is located below the water-repellent particle layer 13, and liquefies by cooling the water vapor that has passed through the water-repellent particle layer 13. Here, the liquefying layer 14 is kept at a predetermined temperature or lower (for example, 15° C. or lower).

It should be noted that, at the interface between the liquefying layer 14 and the water-repellent particle layer 13, the desalination apparatus 10 may include a support layer such as a mesh, for example, for avoiding easy falling of the water-repellent particles in the water-repellent particle layer down to the liquefying layer 14.

[Desalination System]

The desalination apparatus configured as above can be implemented not only as a device but also as a system. Hereinafter, an example of the desalination system in the present embodiment will be described with reference to FIG. 4.

Figure 4:
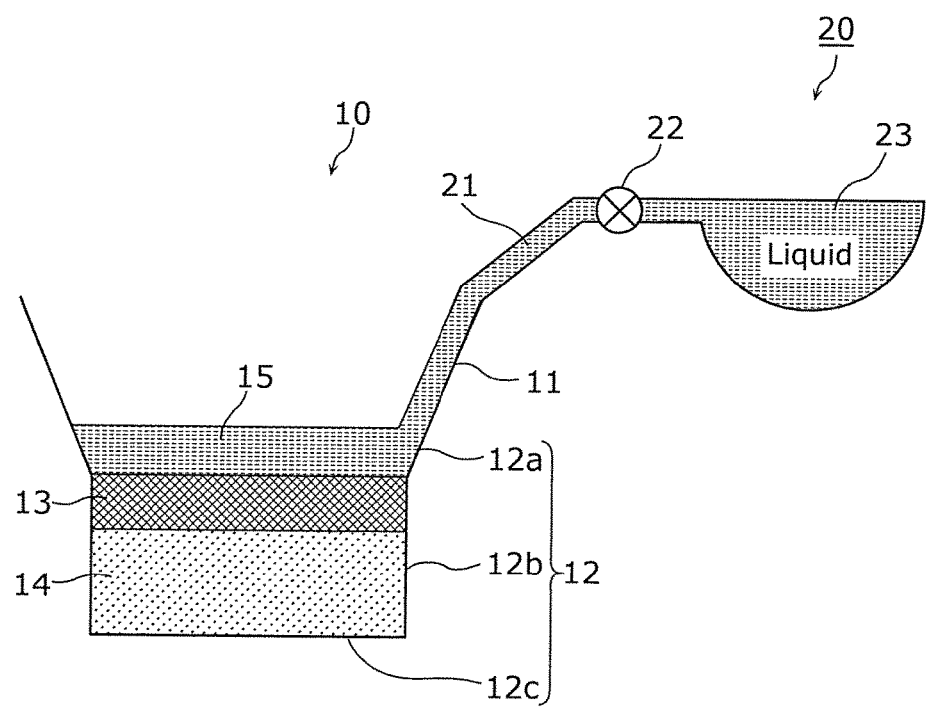
FIG. 4 is a sectional view illustrating an exemplary configuration of a desalination system with a basic configuration.

FIG. 4 is a sectional view illustrating an exemplary configuration of a desalination system in Embodiment 1.

A desalination system 20 shown in FIG. 4 is, for example, a system that obtains fresh water from seawater, and includes the desalination apparatus 10 described above and a sluice gate 22. Structural elements similar to those in FIG. 3 are assigned the same reference signs, and the detailed description thereof will be omitted.

The sluice gate 22 is opened and closed so that the introduction of the liquid from the outside of the desalination apparatus 10 to the water tank 11 is started and stopped, respectively. More specifically, the sluice gate 22 is provided in the introduction passage 21, and regulates the amount of the liquid to be introduced to the water tank 11 (the introduction amount) via the introduction passage 21.

In an example illustrated by FIG. 4, the sluice gate 22 regulates the amount of flow of the liquid between the water tank 11 and an external tank 23 in which the liquid is stored. When the sluice gate 22 is opened, the liquid is introduced from the external tank 23 via the introduction passage 21 to the water tank 11. When the sluice gate 22 is closed, the introduction of the liquid from the external tank 23 via the introduction passage 21 to the water tank 11 is stopped. It should be noted that the opening and closing of the sluice gate 22 may be, for example, operated by a user or the like or, for example, controlled by a sluice gate control device or the like.

The external tank 23 is, for example, the sea, a pretreatment tank that stores seawater introduced from the sea, or a tank that stores salt water supplied separately.

In the desalination system 20 configured as above, the sluice gate 22 is provided, thereby regulating the flow of water. Thus, the breach of the water-repellent particle layer 13 caused by the water flow can be suppressed. In other words, with the desalination system 20 in the present embodiment, the sluice gate 22 is provided so as to regulate the water flow, thereby suppressing the movement of the water-repellent particles in the water-repellent particle layer 13.

[Desalination Method]

The following description will be directed to a desalination process carried out by the desalination apparatus 10 or the desalination system 20 configured as above.

<Desalination Process>

Figure 5:
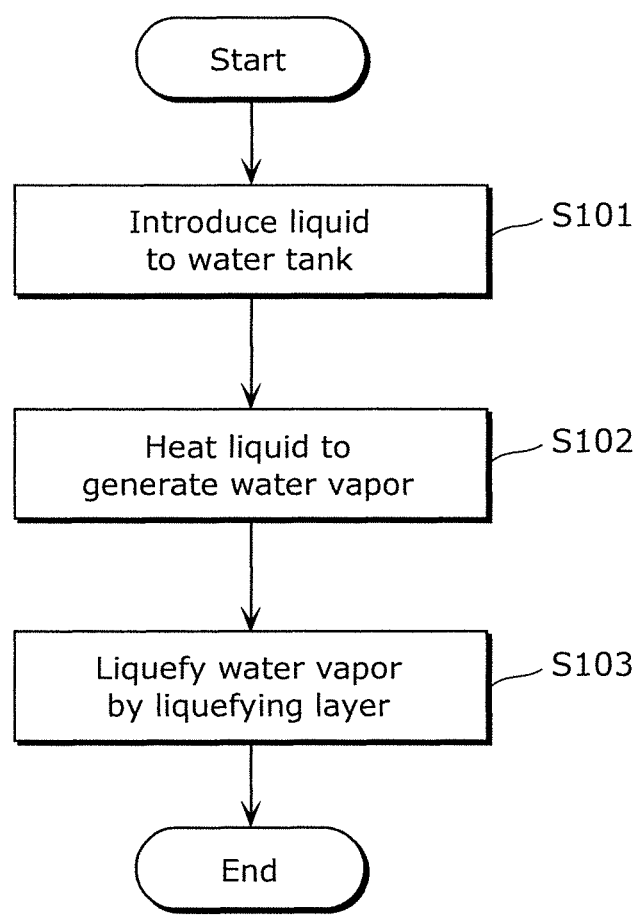
FIG. 5 is a flowchart illustrating steps of a desalination process of the desalination apparatus with the basic configuration.

FIG. 5 is a flowchart illustrating steps of the desalination process of the desalination apparatus 10.

First, the liquid is introduced to the water tank 11, and placed above the water-repellent particle layer 13 (to serve as the liquid layer 15) (S101). Here, the liquid is, for example, salt water.

Incidentally, when the desalination process is carried out in the desalination system 20 shown in FIG. 4, the liquid is poured from the external tank 23 via the sluice gate 22 and the introduction passage 21 into the water tank 11, thus forming the liquid layer 15 on the upper surface of the water-repellent particle layer 13.

Next, by heating and evaporating the liquid placed above the water-repellent particle layer 13, the water vapor is generated (S102). More specifically, when the liquid stored in the water tank 11 (the liquid layer 15) is heated to a temperature higher than or equal to a certain temperature, the liquid turns to the water vapor.

Incidentally, the above-noted certain temperature is determined according to a saturation vapor pressure curve based on the kind of the liquid and atmospheric pressure. For example, when the liquid is salt water, the certain temperature is from 50° C. to 60° C. The liquid layer 15 may be heated, for example, by sunlight or by a heater if the water tank 11 includes the heater. Alternatively, the liquid layer 15 may be heated by supplying a heated object into the liquid layer 15 in the water tank 11.

Subsequently, the water vapor is liquefied by the liquefying layer 14, thereby obtaining the fresh water (S103).

More specifically, the water vapor obtained by heating and evaporating the liquid in the water tank 11 moves not only upward but also downward. When the water vapor moving downward passes through the gap between the water-repellent particles in the water-repellent particle layer 13 and reaches the liquefying layer 14, it is liquefied by the liquefying layer 14 to become liquid water. In other words, the water vapor obtained by heating and evaporating the liquid in the water tank 11 is cooled in the liquefying layer 14 to become liquid water.

In this manner, the desalination process of the desalination apparatus 10 (or the desalination system 20) is performed.

It should be noted that the liquid water is water in which solids contained in the liquid that has been poured into the water tank 11 and impurities dissolved therein are reduced, and typically fresh water (distilled water). The impurities dissolved in the liquid are, for example, ions.

It should be noted that the desalination system is not limited to the example illustrated in FIG. 4. The following description will be directed to another example of the desalination system.

Figure 6:
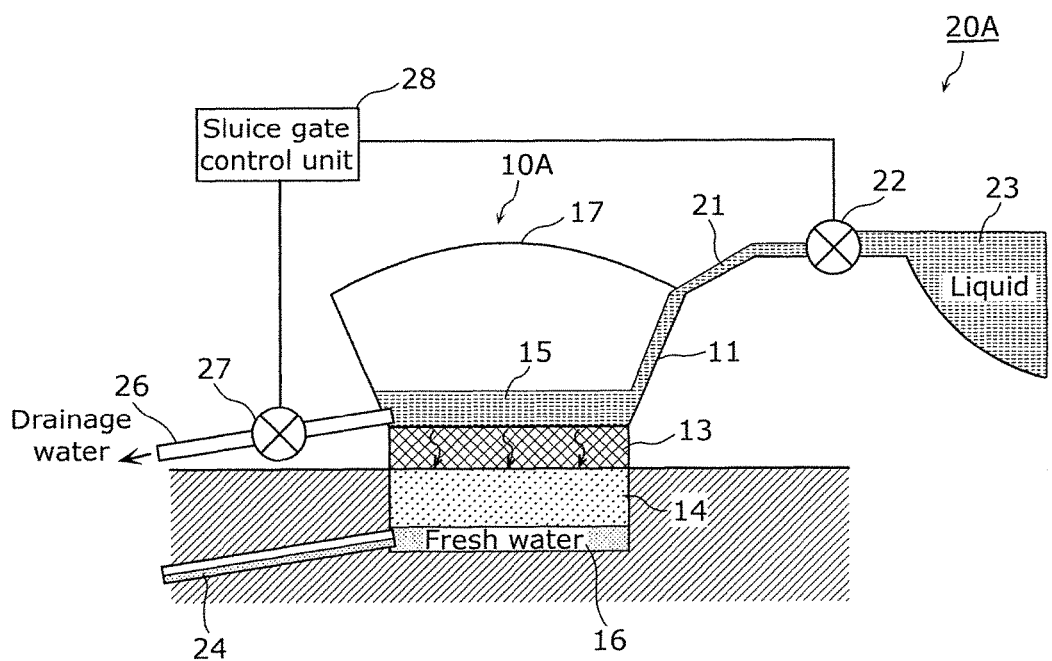
FIG. 6 is a sectional view illustrating an exemplary configuration of a desalination system with a basic configuration.

FIG. 6 is a sectional view illustrating an example of a basic configuration of the desalination system.

A desalination system 20A illustrated in FIG. 6 obtains fresh water from seawater, for example, and includes the desalination apparatus 10A described above, an introduction passage 21, a sluice gate 22, an external tank 23, a drain passage 24, a drain pipe 26, a discharge valve 27 and a sluice gate control unit 28. Structural elements similar to those in FIG. 3 are assigned the same reference signs, and the detailed description thereof will be omitted.

The desalination apparatus 10A includes a lid 17 unlike the desalination apparatus 10 illustrated in FIG. 3. Since other configurations are similar to those of the desalination apparatus 10, the description thereof will be omitted.

The lid 17 is provided in the water tank 11, and covers an opening of the water tank 11 (the upper side wall 12a). The lid 17 is formed of a transparent member when the liquid layer 15 of the desalination apparatus 10A is heated by sunlight. The desalination apparatus 10A includes the lid 17, whereby it is possible to not only reduce the water vapor upwardly escaping from the water tank 11 but also reduce the impurities entering through the opening of the water tank 11.

The drain passage 24 is connected with the liquefying layer 14, and discharges the fresh water (distilled water) from the liquefying layer 14 to the outside. Incidentally, the drain passage 24 may be provided with a fresh water discharge valve (not shown). In that case, the fresh water discharge valve is opened so as to discharge fresh water 16 (distilled water) from the liquefying layer 14 via the drain passage 24 to the outside, whereas the fresh water discharge valve is closed so as to stop discharging the fresh water 16 (distilled water) from the liquefying layer 14. It should be noted that the opening and closing of the fresh water discharge valve may be controlled by the sluice gate control unit 28.

The drain pipe 26 is connected with the water tank 11, and discharges the liquid from the liquid layer 15 to the outside.

The discharge valve 27 is provided in the drain pipe 26. The discharge valve 27 is opened so as to discharge the liquid from the liquid layer 15 in the water tank 11, and closed so as to stop discharging the liquid from the liquid layer 15 in the water tank 11. The opening and closing of the discharge valve 27 is controlled by the sluice gate control unit 28.

The sluice gate control unit 28 may control the opening and closing of the sluice gate 22, the discharge valve 27 and so on according to information inputted by a user or the like utilizing an input unit (not shown). Here, the input unit is, for example, a touch panel, a keyboard, a cursor, a microphone or the like. Also, the information to be inputted to the input unit by the user or the like is, for example, information indicating an instruction to open the sluice gate 22 or information indicating an instruction to close the sluice gate 22.

Figure 7:
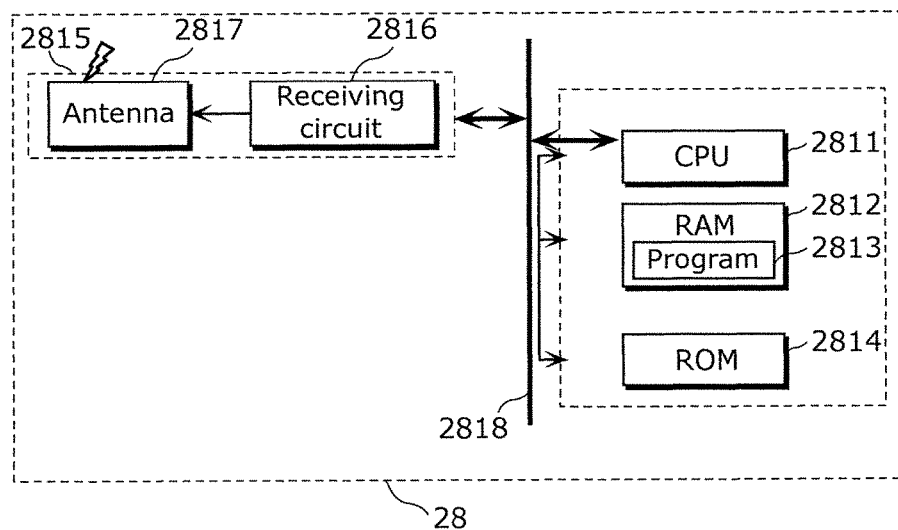
FIG. 7 is a block diagram illustrating an example of a hardware configuration of a sluice gate control unit in Variation 1 of the basic configuration.

FIG. 7 is a block diagram illustrating an example of a hardware configuration of the sluice gate control unit 28 in Variation 1 of the basic configuration.

As shown in FIG. 7, the sluice gate control unit 28 includes, for example, a CPU 2811, a RAM 2812, a ROM 2814, a receiving unit 2815 and a bus 2818.

The CPU 2811 executes a program 2813 stored in the RAM 2812. In the program 2813, procedures in FIG. 5 explained above are described. It is noted that the program 2814 may be stored in the ROM 2814.

The receiving unit 2815 includes an antenna 2817 and a receiving circuit 2816, and receives information indicating opening/closing of the sluice gate, etc. For example, when the user or the like inputs the information to the input unit, the information is transmitted from the antenna provided in the input unit. In that case, in the sluice gate control unit 28, the transmitted information is received by the antenna 2817 and accepted by the receiving circuit 2816.

The receiving circuit 2816 and the CPU 2811 are connected to each other via the bus 2818, and can mutually transfer data. The information accepted by the receiving unit 2815, namely, the receiving circuit 2816 is transmitted to the CPU 2811 via the bus 2818.

It should be noted that a structure such as a film capable of passing the liquid or the water vapor therethrough may be disposed between the water tank 11 and the water-repellent particle layer 13. Moreover, a structure such as a film capable of passing the water vapor therethrough may be disposed between the water-repellent particle layer 13 and the liquefying layer 14.

Although the above description is mainly directed to an example of obtaining fresh water from salt water, there is no particular limitation to the salt water. For example, in the case of obtaining distilled water (fresh water) from drainage water or the like in which chemical substances are dissolved instead of the salt water, the chemical substances dissolved in the liquid can be reduced similarly. Consequently, the desalination apparatuses 10 and 10A described above can remove impurities dissolved in the liquid.

Figure 8A:
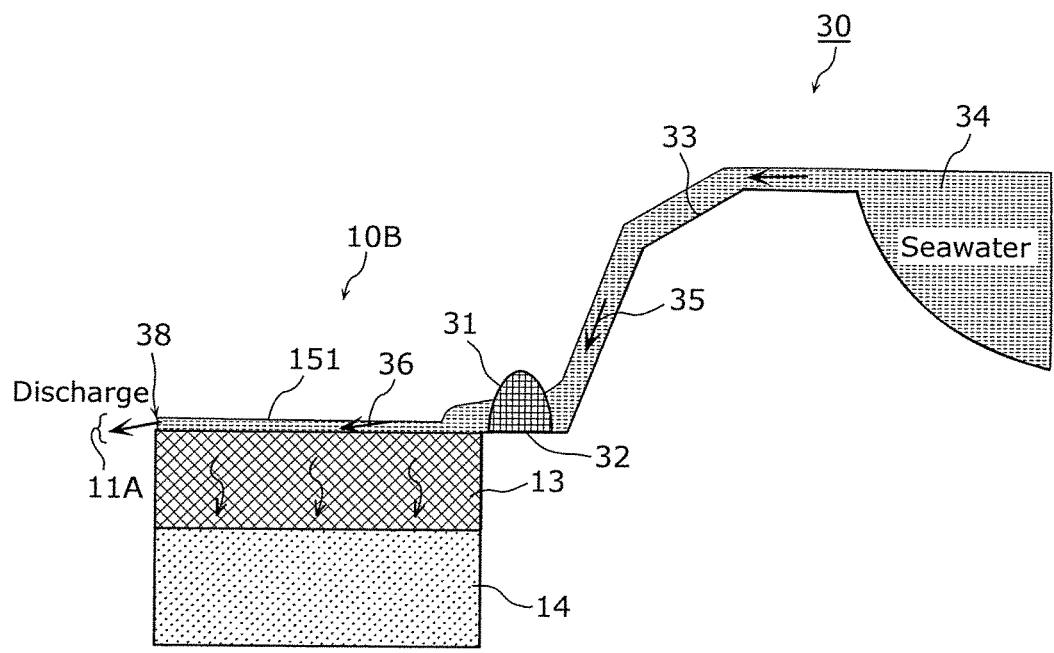
FIG. 8A is a sectional view illustrating an exemplary configuration of a desalination system in Embodiment 1.
Figure 8B:
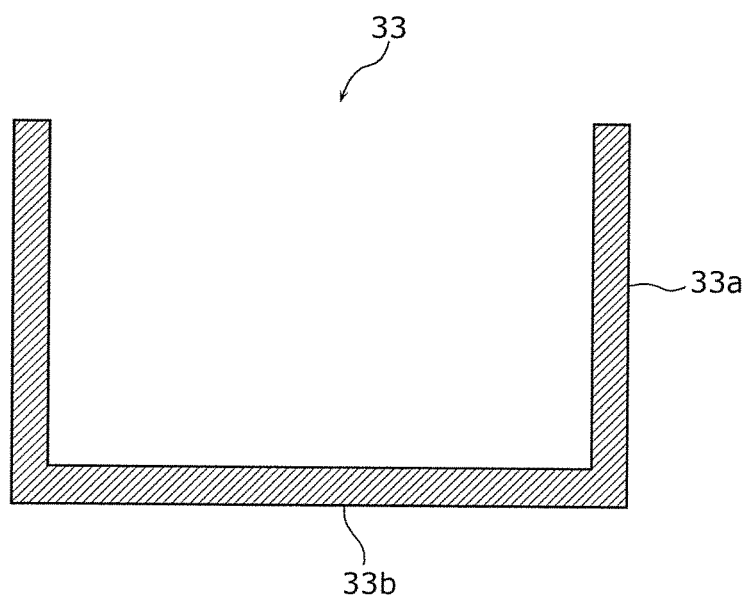
FIG. 8B is a sectional view illustrating an exemplary introduction channel in Embodiment 1.
Figure 8C:
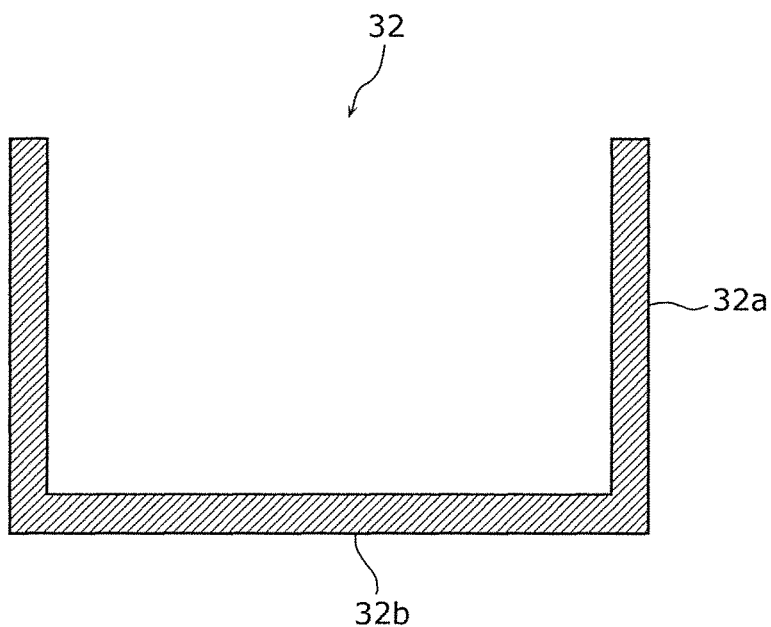
FIG. 8C is a sectional view illustrating an exemplary supply channel in Embodiment 1.
Figure 9A:
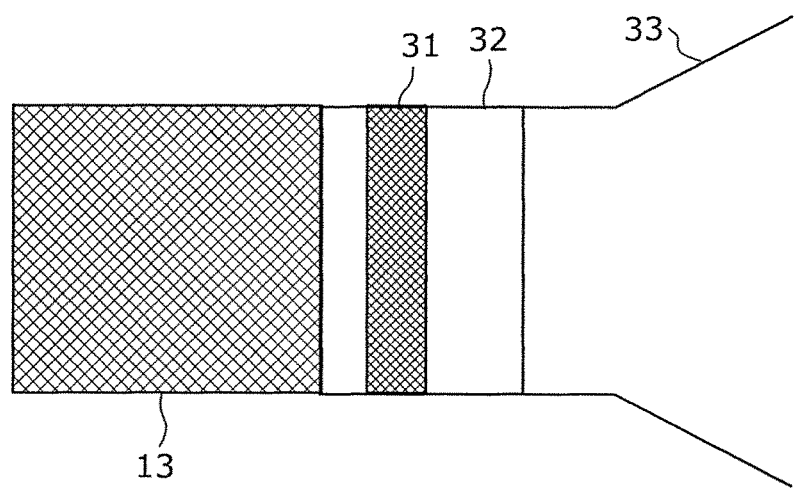
FIG. 9A illustrates an example of how to install a liquid speed reduction part in Embodiment 1.
Figure 9B:
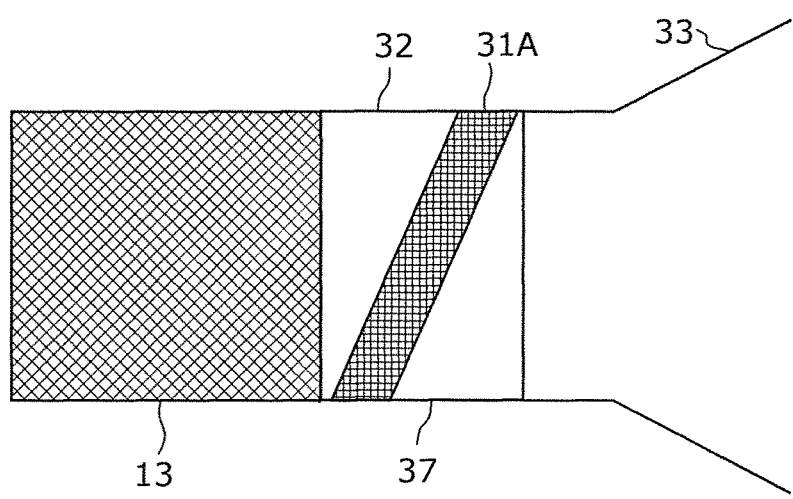
FIG. 9B illustrates an example of how to install the liquid speed reduction part in Embodiment 1.

FIG. 8A is a sectional view illustrating an exemplary configuration of the desalination system according to the present disclosure. FIG. 8B is a sectional view illustrating an exemplary introduction channel. FIGS. 9A and 9B illustrate examples of how to install a liquid speed reduction part. FIGS. 8C, 9C to 9F illustrate examples of a supply channel and a liquid speed reduction part. FIGS. 10A and 10B illustrate examples of the shape of the liquid speed reduction part. Structural elements similar to those in FIG. 3 are assigned the same reference signs, and the detailed description thereof will be omitted.

A desalination system 30 illustrated in FIG. 8A includes a liquid speed reduction part 31 and a desalination apparatus 10B that obtains fresh water from a liquid. Even if the desalination system 30 is replaced by the desalination apparatus 10A illustrated in FIG. 6, it produces similar effects as described later.

The desalination apparatus 10B includes a water tank 11A, the water-repellent particle layer 13 and the liquefying layer 14, and obtains the fresh water from the liquid. The desalination apparatus 10B is connected with the supply channel 32, which is an introduction channel for supplying the liquid to the desalination apparatus 10B. The supply channel 32 is connected with the introduction channel 33 for introducing the liquid from the external tank 34.

An arrow 36 indicated by a solid line in FIG. 8A schematically illustrates the liquid flowing in the water tank 11A, and an arrow 35 indicated by a solid line in FIG. 8A schematically illustrates a liquid flow in the introduction channel 33. The liquid to be supplied to the water tank 11A is also referred to as a "pre-desalination liquid," whereas the fresh water obtained in the liquefying layer 14 is also referred to as a "post-desalination liquid."

<Water Tank 11>

As in the basic configuration described above, a lateral surface of the water tank 11A is formed of the upper side wall 12a, and a bottom surface thereof is formed of an upper surface of the water-repellent particle layer 13. The water tank 11A has a space that is surrounded by the upper side wall 12a and the water-repellent particle layer 13 and stores the liquid. A part of the lateral surface of the water tank 11A is connected with the supply channel 32.

A part of the lateral surface of the water tank 11A to be connected with the supply channel 32 may be formed of the liquid speed reduction part 31 located in the supply channel 32 described later, instead of the upper side wall 12a. A portion having no upper side wall 12a in the water tank 11A is connected with the supply channel 32. The water tank 11A has a space surrounded by the upper side wall 12a, the water-repellent particle layer 13 and the liquid speed reduction part 31.

Alternatively, a part of an upper end of the upper side wall 12a may be connected with the supply channel 32.

The water tank 11A has the lateral surface provided with a discharge port 38 through which the liquid is discharged. The discharge port 38 may be disposed at a position opposed to the position of the supply channel 32 in the lateral surface of the water tank 11A. In other words, the discharge port 38 is disposed at the position opposed to the supply channel 32, with the space in the water tank 11A for storing the liquid interposed therebetween.

In this way, the liquid gradually flows in the water tank 11A, for example, in a direction indicated by the arrow 36 shown in FIG. 8A, and is discharged through the discharge port 38. Here, the discharge port 38 may be a liquid discharge channel of the water tank 11A or may have any mode as long as a part of the liquid in the water tank 11A gradually flows and is discharged. Incidentally, since other matters are similar to those described in the basic configuration, the detailed description thereof will be omitted.

<Water-Repellent Particle Layer 13>

The water-repellent particle layer 13 is located below the water tank 11A, and formed of a plurality of water-repellent particles. When the liquid contained in the water tank 11A has a height smaller than or equal to a predetermined height, the liquid cannot pass through the water-repellent particle layer 13. On the other hand, the water vapor generated by evaporating the liquid in the water tank 11A passes through the water-repellent particle layer 13. Since details are similar to those described in the basic configuration, the description thereof will be omitted.

<Liquefying Layer 14>

The liquefying layer 14 is located below the water-repellent particle layer 13. The liquefying layer 14 obtains the fresh water by liquefying the water vapor that has passed through the water-repellent particle layer 13. Since details are similar to those described in the basic configuration, the description thereof will be omitted.

<Introduction Channel 33>

The introduction channel 33 is connected between the external tank 34 and the supply channel 32, and directs the liquid from the external tank 34 to the supply channel 32. FIG. 8B is a sectional view of the introduction channel 33 taken along a direction perpendicular to a movement direction of the liquid. The introduction channel 33 illustrated in FIG. 8B includes at least a side wall 33a and a bottom surface 33b, and directs the liquid to the supply channel 32 through a passage surrounded by the side wall 33a and the bottom surface 33b.

In order to direct the liquid from the external tank 34 to the supply channel 32, the introduction channel 33 may be downwardly inclined along a direction from the external tank 34 to the supply channel 32. In other words, the introduction channel 33 may be formed such that a connection portion of the introduction channel 33 and the external tank 34 is located at a higher position relative to a connection portion of the introduction channel 33 and the supply channel 32. The downward inclination of the introduction channel 33 allows the liquid to flow in the direction indicated by the arrow 35 illustrated in FIG. 8A.

In the case of introducing the liquid at an amount greater than or equal to a predetermined amount to the introduction channel 33 so as to direct the liquid to the supply channel 32, the introduction channel 33 does not have to be inclined.

<Supply Channel 32>

The supply channel 32 is an example of a passage of the liquid to be introduced to the desalination apparatus 10B. The supply channel 32 is connected to the introduction channel 33, and directs the liquid introduced from the introduction channel 33 to the water tank 11A. The supply channel 32 includes at least a side wall 32a and a bottom surface 32b. FIG. 8C is a sectional view of the supply channel 32 taken along a direction perpendicular to a movement direction of the liquid. The passage surrounded by the side wall 32a and the bottom surface 32b illustrated in FIG. 8C allows the liquid to be introduced from the introduction channel 33 to the water tank 11A.

Similarly to the introduction channel 33, the channel from the connection portion of the supply channel 32 and the introduction channel 33 toward the water tank 11A may be downwardly inclined. In other words, the supply channel 32 may be formed such that the connection portion of the supply channel 32 and the introduction channel 33 is located at a higher position relative to a connection portion of the supply channel 32 and the water tank 11A. The downward inclination of the supply channel 32 allows the liquid to flow from the supply channel 32 toward the water tank 11A.

Figure 8D:
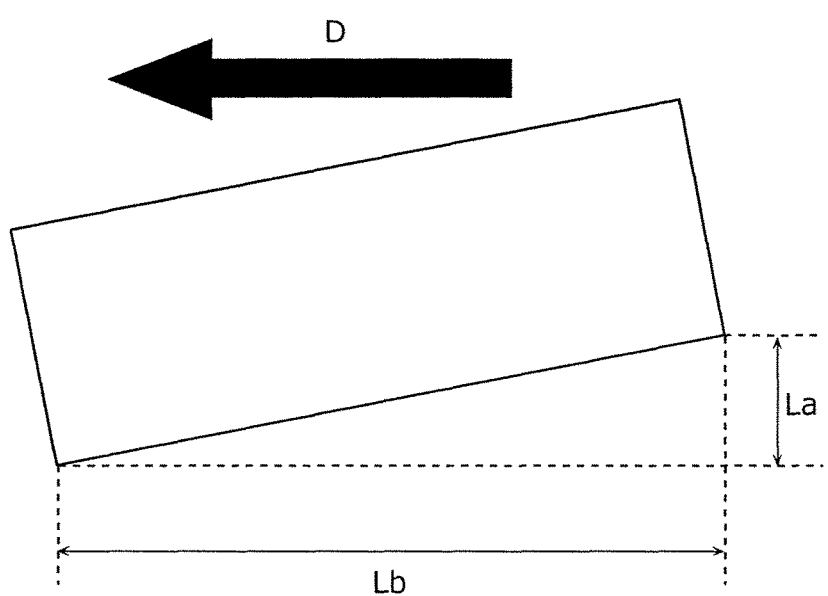
FIG. 8D is a sectional view illustrating the exemplary supply channel viewed from its lateral surface in Embodiment 1.

For example, the inclination may be at least 0.001 (0.1%). FIG. 8D illustrates the side wall 32a of the supply channel 32 viewed from its lateral surface. A solid line D illustrated in FIG. 8D indicates a general liquid flow direction. In the present description, the inclination means a value obtained by dividing the length (La) of the supply channel 32 along a direction perpendicular to the general liquid flow direction by the length (Lb) of the supply channel 32 along the general liquid flow direction. Alternatively, the inclination can also be expressed as the ratio of the length (La) of the supply channel 32 along the direction perpendicular to the general liquid flow direction to the length (Lb) of the supply channel 32 along the general liquid flow direction.

In the case of introducing the liquid at an amount greater than or equal to a predetermined amount to the supply channel 32 so as to direct the liquid to the water tank 11A, the introduction channel 33 does not have to be inclined.

It should be noted that the introduction channel 33 and the supply channel 32 may be formed integrally. In the following, a structure including the introduction channel 33 and the supply channel 32 is also referred to as an "introduction channel."

<Liquid Speed Reduction Part 31>

The liquid speed reduction part 31 is provided on the supply channel 32. The liquid speed reduction part 31 reduces a flow speed of the liquid supplied from the introduction channel 33 to the water tank 11A.

The liquid speed reduction part 31 is provided at a position blocking the liquid flowing through the supply channel 32, and reduces the flow speed of the liquid. The liquid speed reduction part 31 includes a wall surface that crosses a flow direction of the liquid in the supply channel 32.

The position blocking the liquid flowing through the supply channel 32 is a position across the entire channel width (passage width) of the supply channel 32. In this case, the wall surface of the liquid speed reduction part 31 is disposed at the position across the entire channel width (passage width) of the supply channel 32. In other words, the wall surface of the liquid speed reduction part 31 has a width corresponding to a distance across the entire channel width (passage width) of the supply channel 32. The wall surface of the liquid speed reduction part 31 may be located so as to cross the flow direction of the liquid in the supply channel 32, whereby the liquid flowing through the supply channel 32 makes contact with the wall surface as described later.

For example, as illustrated in FIG. 9A, the liquid speed reduction part 31 is provided on the supply channel 32 along the direction perpendicular to the flow direction of the liquid in the supply channel 32 so as to span the channel width (passage width) of the supply channel 32.

Alternatively, for example, as illustrated in FIG. 9B, a liquid speed reduction part 31A may be provided on the supply channel 32 along the direction crossing the flow direction of the liquid in the supply channel 32 so as to span the passage width of the supply channel 32.

Furthermore, as illustrated in FIGS. 9A and 9B, the liquid speed reduction part 31 includes a wall surface that crosses the flow direction of the liquid in the supply channel 32. Moreover, the liquid speed reduction part 31 can also be expressed as a wall portion that has a predetermined height or greater and a width identical with a width of a portion of the supply channel 32 in which the liquid flows. The wall portion at least has a wall surface, which is a surface formed along a direction crossing the flow direction of the liquid in the supply channel 32. The wall surface is appropriate as long as it includes the portion formed along the direction crossing the flow direction of the liquid in the supply channel 32.

Here, to "block the flowing liquid" does not mean that the liquid speed reduction part 31 is disposed on the supply channel 32 in such a manner as to stop the liquid flow in the supply channel 32.

The liquid speed reduction part 31 is located at a position crossing the flow of the liquid in the supply channel 32 (a position partially blocking the liquid flow), whereby the liquid makes contact with the liquid speed reduction part 31 (especially, the wall surface thereof), so that energy of the liquid flow decreases. The energy of the liquid flow is expressed as the product of the flow amount and the flow speed. It is desired that the liquid speed reduction part 31 is located so as to partially block the liquid flow, whereby at least the flow speed of the liquid is reduced.

For example, when the liquid contacts the liquid speed reduction part 31, the flow amount of the liquid does not increase and the flow speed of the liquid decreases. In other words, the liquid speed reduction part 31 can cause the flow speed of the liquid flowing downstream of the position of the liquid speed reduction part 31 in the supply channel 32 to be lower than the flow speed of the liquid flowing upstream of the position of the liquid speed reduction part 31. The liquid whose flow speed is reduced is directed to the water tank 11A.

Furthermore, when the liquid contacts the liquid speed reduction part 31, the flow speed of the liquid does not increase and the flow amount of the liquid decreases. In other words, the liquid speed reduction part 31 can cause the flow amount of the liquid flowing downstream of the position of the liquid speed reduction part 31 in the supply channel 32 to be smaller than the flow amount of the liquid flowing upstream of the position of the liquid speed reduction part 31. The liquid whose flow amount is reduced is directed to the water tank 11A.

In this manner, it is possible to reduce the energy of the liquid to be introduced to the vicinity of the portion immediately below the water tank 11A connected with the supply channel 32 (the liquid introduction position). This can reduce the force caused by the liquid flow and applied to the water-repellent particle layer 13, thus reducing the amount of the water-repellent particle layer 13 to be eroded (the amount of the water-repellent particles to be suspended in the water tank 11A).

The liquid speed reduction part 31 is formed of a plurality of gravel, concrete and so on. The liquid speed reduction part 31 is, for example, a bank formed of a plurality of tetrapods.

Figure 9C:
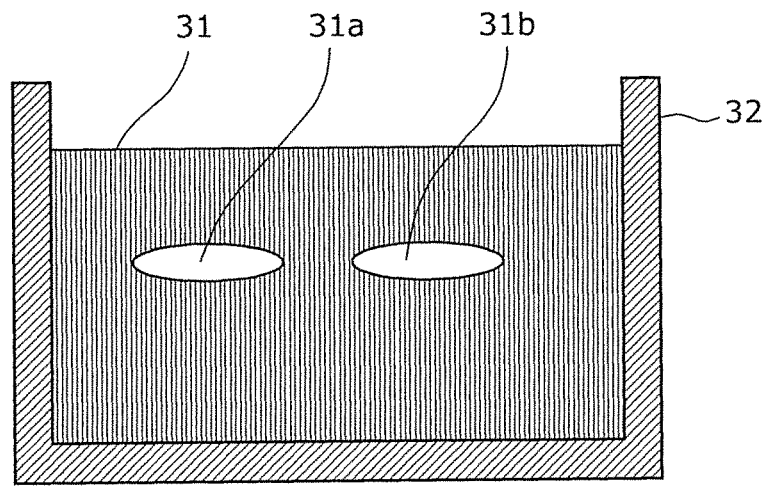
FIG. 9C illustrates examples of the supply channel and the liquid speed reduction part in Embodiment 1.
Figure 10A:
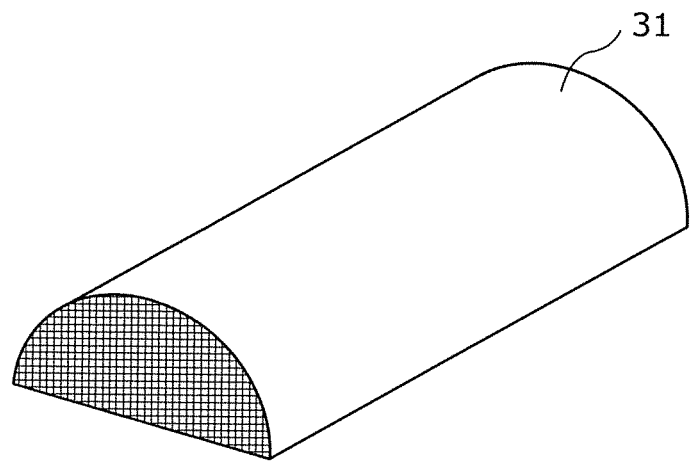
FIG. 10A illustrates an example of a shape of the liquid speed reduction part in Embodiment 1.
Figure 10B:
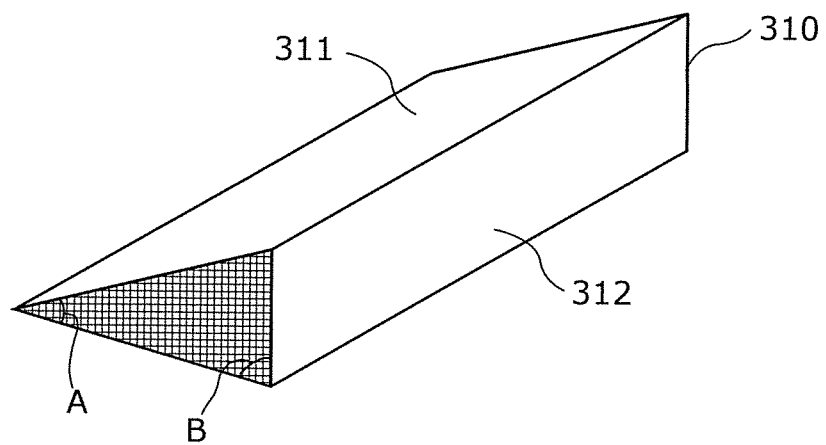
FIG. 10B illustrates an example of the shape of the liquid speed reduction part in Embodiment 1.

FIG. 9C illustrates examples of the supply channel 32 and the liquid speed reduction part 31 viewed in their cross-sections taken perpendicularly to the flow direction of the liquid. For example, as illustrated in FIG. 9C, the liquid speed reduction part 31 includes a plurality of openings 31a and 31b that are smaller than the supply channel 32 viewed in their cross-sections taken perpendicularly to the flow direction of the liquid. Incidentally, this can also be expressed as the wall surface of the liquid speed reduction part 31 including the plurality of openings 31a and 31b.

Figure 9D:
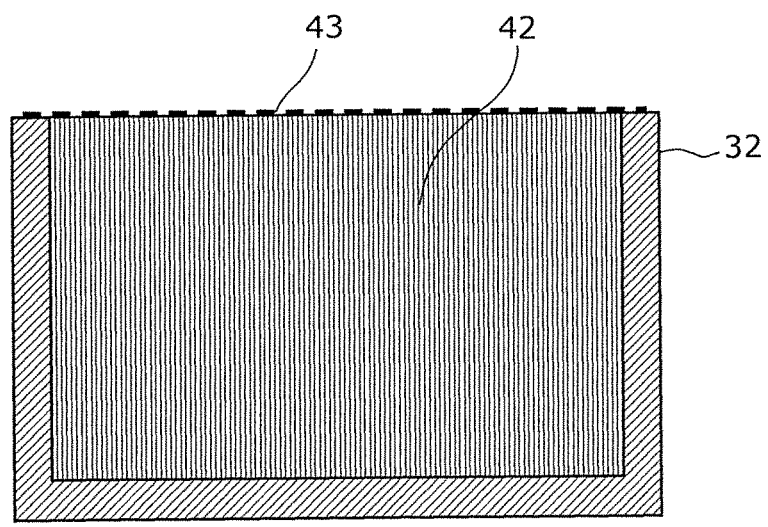
FIG. 9D illustrates an exemplary supply channel in Embodiment 1.

FIG. 9D illustrates the supply channel 32 viewed in its cross-section taken perpendicularly to the flow direction of the liquid. As illustrated in FIG. 9D, the size of the supply channel 32 viewed in its cross-section taken perpendicularly to the flow direction of the liquid means the size of a region 42 surrounded by the two side walls 32a, the bottom surface 32b and a virtual line (a line 43) extending from an upper end portion of one side wall 32a to that of the other.

Figure 9E:
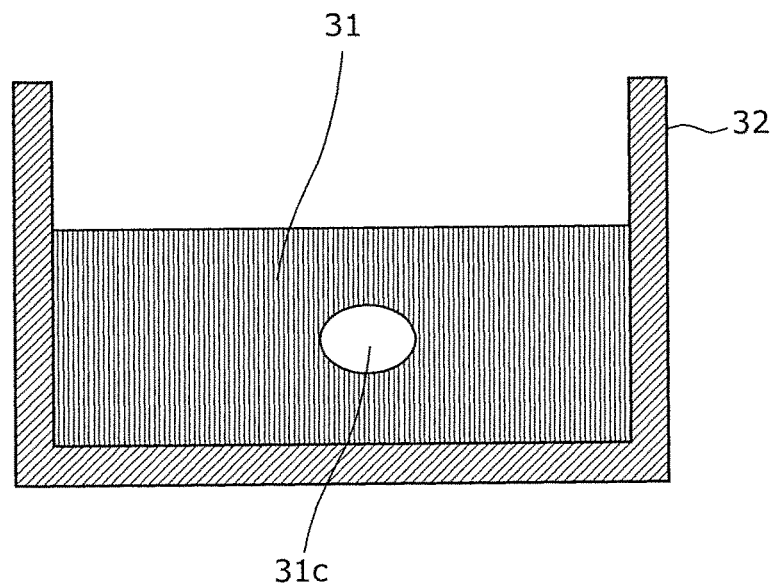
FIG. 9E illustrates examples of the supply channel and the liquid speed reduction part in Embodiment 1.

FIG. 9E illustrates examples of the supply channel 32 and the liquid speed reduction part 31 viewed in their cross-sections taken perpendicularly to the flow direction of the liquid. As illustrated in FIG. 9E, the liquid speed reduction part 31 does not have to include a plurality of openings. The liquid speed reduction part 31 is appropriate as long as the total area of the opening included in the liquid speed reduction part 31 is smaller than the area of the supply channel 32 in their cross-sections taken perpendicularly to the flow direction of the liquid.

Figure 9F:
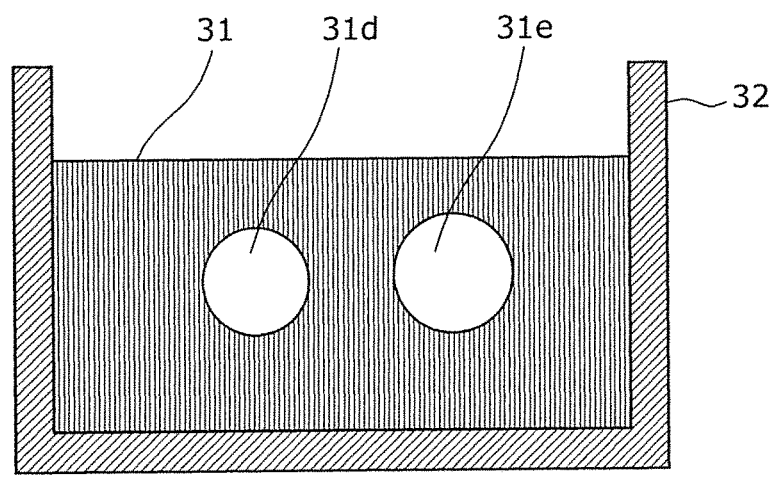
FIG. 9F illustrates examples of the supply channel and the liquid speed reduction part in Embodiment 1.

Alternatively, in the case where the energy (flow amount× flow speed) of the liquid flowing through the supply channel 32 is set to fall within a predetermined range, the liquid speed reduction part 31 includes openings 31d and 31e whose cross-sections are smaller than the cross-section of the liquid when the energy (flow amount or flow speed) of the liquid flowing through the supply channel 32 is smallest, as illustrated in FIG. 9F.

It should be noted that the openings of the liquid speed reduction part may have any of a spherical shape, an elliptical shape, a rectangular shape, a polygonal shape, etc. as long as their cross-sectional areas satisfy the condition mentioned above. Also, the opening may be located at least at a predetermined height in the liquid speed reduction part 31. The position of the opening should be set appropriately depending on the flow amount of the liquid. For example, the opening is located at least at a height that is half the height of the water surface of the liquid flowing through the supply channel 32.

In this manner, at least a part of the liquid flowing through the supply channel 32 contacts the liquid speed reduction part 31. The liquid speed reduction part 31 serves as an obstacle to the liquid flow and can reduce the energy of the entire liquid. As described above, the liquid passes through the interior of the liquid speed reduction part 31 via the opening, whereby the flow speed or the flow amount is reduced.

Moreover, the liquid speed reduction part 31 may have a height lower than or equal to a predetermined height, with no liquid passing through the interior of the liquid speed reduction part 31. For example, when the liquid has an energy larger than that corresponding to the height from the bottom surface of the supply channel 32 to the upper end portion of the side wall 33a of the liquid speed reduction part 31, the liquid climbs over the liquid speed reduction part 31 and flows in the supply channel 32. By climbing over the liquid speed reduction part 31, the liquid has a reduced energy. As described above, the liquid may be caused to climb over the liquid speed reduction part 31, thereby reducing the flow speed or the flow amount of the liquid.

In the case where the energy (flow amount×flow speed) of the liquid flowing through the supply channel 32 is set to fall within a predetermined range, the liquid speed reduction part 31 may have a cross-section taken perpendicularly to the direction of the liquid flowing in the supply channel 32 higher than the height of the water surface of the liquid (the upper end portion of the liquid layer) when the energy (flow amount or flow speed) of the liquid flowing through the supply channel 32 is largest. Otherwise, it may not be possible to sufficiently reduce the energy of the liquid. For example, the liquid speed reduction part 31 is higher than the height of the water surface of the liquid upstream of the position of the liquid speed reduction part 31. Since the water surface of the liquid depends on the flow amount, the liquid speed reduction part 31 may have, for example, the same height as the side wall 32a illustrated in FIG. 8C.

For instance, the liquid speed reduction part 31 has a height that is larger than 80% of the height of the side wall 32a illustrated in FIG. 8C and smaller than the height thereof.

Herein, FIGS. 10A and 10B illustrate examples of the shape of the liquid speed reduction part. The liquid speed reduction part 31 illustrated in FIG. 10A has a semi-cylindrical shape. Also, a liquid speed reduction part 310 illustrated in FIG. 10B may have a triangular prismatic shape having different base angles. The hatched region in the liquid speed reduction part illustrated in each of FIGS. 10A and 10B contacts the side wall 32a of the supply channel 32. On the surface contacting the supply channel 32, a base angle A of the liquid speed reduction part 310 closer to the desalination apparatus 10B is smaller than a base angle B thereof on the opposite side of the desalination apparatus 10B.

When the liquid speed reduction part 31 illustrated in FIG. 10B is placed in the supply channel 32, the liquid makes contact with a surface 312, climbs over the liquid speed reduction part 310 and moves over a surface 311. The liquid that has moved over the surface 311 is introduced to the water tank 11A.

In this way, the liquid makes contact with the surface 312, so that the energy of the liquid is reduced. Furthermore, it is possible to suppress an increase in the flow speed of the liquid while the liquid is moving from the height of the surface 312 to the height of the bottom surface of the supply channel 32. The surface 312 corresponds to the wall surface described above.

Additionally, when the liquid speed reduction part 310 includes the opening 31a, etc., the liquid makes contact with the surface 312, followed by passing through (seeping into and through) the interior of the liquid speed reduction part 310 via the opening, thereby reducing the flow speed of the liquid.

Incidentally, the shape of the liquid speed reduction part 31 is not limited to these examples but may be rectangular parallelepiped. Also, the shape of the liquid speed reduction part 31 may be a triangular prismatic or rectangular parallelepiped shape whose corners are rounded. The corners of the liquid speed reduction part 31 mean portions forming an acute angle in its cross-section.

As described above, the desalination system 30 in the present embodiment includes the liquid speed reduction part 31, thereby reducing the energy of the liquid to be introduced, in particular, to the vicinity of the portion immediately below the water tank 11A connected with the supply channel 32 (the liquid introduction position). Compared with the case of providing no liquid speed reduction part 31, it is possible to introduce the liquid having a smaller energy (at least a lower flow speed) to the water tank 11A. Consequently, the erosion of the water-repellent particle layer 13 (the movement of the water-repellent particles in the water-repellent particle layer 13) can be suppressed, thus making it possible to alleviate the problem of desalination being impossible.

When the liquid has different flow speeds at every position in the water tank 11A, the depth of the recessed portions formed by the erosion of the water-repellent particles also varies. Thus, it is desired that the liquid flow at a substantially constant flow speed on the surface of the water-repellent particle layer 13.

It is desired that the supply channel 32 have at least a predetermined length along the flow direction of the liquid on the side of the water tank 11A with respect to the position of the liquid speed reduction part 31. In other words, the supply channel 32 has at least a predetermined length between the position of the liquid speed reduction part 31 and the position of the connection portion of the supply channel 32 and the water tank 11A. The predetermined length is determined depending on the flow speed, flow amount or the height of the liquid speed reduction part 31. For example, the supply channel 32 may have a length at least twice the height of the liquid speed reduction part 31 between the position of the liquid speed reduction part 31 and the position of the connection portion of the supply channel 32 and the water tank 11A.

Since the liquid speed reduction part 31 serves as the obstacle to the liquid, it not only reduces the energy of the liquid but also locally changes the flow direction of the liquid. The liquid flowing upstream of the liquid speed reduction part 31 is a substantially steady flow with respect to a width direction or a depth direction of the supply channel 32. In general, when the flow channel is viewed from above, the liquid in a central portion has a relatively higher flow speed than the liquid in peripheral portions. The flow speed gradually increases from the peripheral portions to the central portion.

However, the liquid that has passed through the liquid speed reduction part 31 is likely to have a locally different flow direction. When the liquid having a locally different flow direction is supplied to the water tank 11A, the water-repellent particle layer 13 may have recessed portions with different depths depending on the position in the water tank 11A. In particular, there is a possibility that a part of the water-repellent particle layer 13 located in the vicinity of the connection portion of the water tank 11A and the supply channel 32 is more easily eroded by the local flow of the liquid. When such a condition continues, the water-repellent particle layer 13 develops locally deep recessed portions.

At this time, in order to prevent the water-repellent particle layer 13 from being breached, the liquid at an amount corresponding to the deepest recessed portion has to be introduced to the water tank 11A. However, if the liquid is introduced according to the length from the water surface of the liquid to the surface of the deepest recessed portion, the length from the water surface of the liquid to the surface of a portion having no recessed portion is likely to be smaller than the optimal thickness of the liquid layer. Also, the liquid amount is likely to be smaller than the liquid amount that is optimal for an efficient desalination process. Additionally, it is difficult to detect the depth of the recessed portion formed owing to local changes in the flow. Thus, there is a possibility that the liquid amount corresponding to the depth of the recessed portion cannot be supplied. Accordingly, it is desired that the liquid having a substantially steady flow be supplied to the water tank 11A so as to suppress the formation of the locally deep recessed portion.

The supply channel 32 has at least a predetermined length along the flow direction of the liquid on the side of the water tank 11A with respect to the position of the liquid speed reduction part 31, whereby the liquid flow can be formed so as to reduce the local flow changes caused by the liquid speed reduction part 31.

Also, the width of the supply channel 32 at a position connected with the water tank 11A may be at a predetermined percentage or higher with respect to the width of the water tank 11A.

The width of the supply channel 32 is the length of a side including the connection portion of the water tank 11A and the supply channel 32 or the width near the connection portion of the water tank 11A and the supply channel 32. The width of the water tank 11A is the length of a side including the connection portion of the water tank 11A and the supply channel 32 or the width near the connection portion of the water tank 11A and the supply channel 32.

The width of the supply channel 32 and that of the water tank 11A indicate a direction substantially perpendicular to the flow direction of the liquid. The supply channel 32 has at least a predetermined width, whereby the liquid flow can be made still more steady, making it possible to reduce the erosion of the water-repellent particle layer 13.

Furthermore, the bottom surface of the supply channel 32 from the position of the liquid speed reduction part 31 to the position of the water tank 11A may have substantially the same inclination as the bottom surface of the water tank 11A (the surface of the water-repellent particle layer 13). This helps to reduce the changes in the liquid flow at the connection portion of the supply channel 32 and the water tank 11A, making it possible to reduce the erosion of the water-repellent particle layer 13.

It should be noted that the configuration for suppressing the erosion of the water-repellent particle layer 13 is not limited to the above example. In the following, examples of such a configuration will be described as variations.

(Variation 1)

As illustrated in FIG. 8A, the liquid is introduced from the external tank 34 via the introduction channel 33 to the supply channel 32 along the direction indicated by the arrow 35. Here, when the introduction channel 33 has a height difference, the flow speed of the liquid along the direction indicated by the arrow 35 is very high, so that the flow speed of the liquid (the water flow) cannot be reduced sufficiently by the liquid speed reduction part 31 alone in some cases.

Accordingly, the desalination system illustrated in the present variation reduces the flow speed of the liquid flowing in the introduction channel 33 by a flow amount regulating unit 320 that is located at the connection portion of the introduction channel 33 and the supply channel 32.

The flow amount regulating unit 320 may be provided on the introduction channel 33 or the connection portion of the introduction channel 33 and the supply channel 32 along a direction crossing the direction of the liquid flowing in the introduction channel 33 so as to span the passage width of the introduction channel 33. Incidentally, since the configuration including the introduction channel 33 and the supply channel 32 is also referred to as the "introduction channel" as described above, the phrase "on the introduction channel 33 or the connection portion of the introduction channel 33 and the supply channel 32" is also mentioned as "on the introduction channel."

The flow amount regulating unit 320 can also be expressed as a wall portion that has a predetermined height or greater and the same width as a portion of the supply channel 32 in which the liquid flows. The flow amount regulating unit 320 may have a similar structure to the liquid speed reduction part 31.

The flow amount regulating unit 320 may include a supply port 321. The liquid is supplied from the outside of the desalination apparatus 10B to the supply channel 32 via the supply port 321.

FIGS. 11 to 13B illustrate exemplary configurations of the flow amount regulating unit 320 and the supply port 321 in Variation 1 of Embodiment 1.

The size of the supply port 321 located at the flow amount regulating unit 320 is at least smaller than the size of the opening of the introduction channel 33 illustrated in FIG. 8B.

The size of the flow amount regulating unit 320 viewed in its cross-section taken perpendicularly to the flow direction of the liquid means the size of a region surrounded by the two side walls 33a (side walls 32a), the bottom surface 33b (bottom surface 32b) and a virtual line extending from an upper end portion of one side wall 33a (side wall 32a) to that of the other side wall 33a (side wall 32a). The intended meaning similar to the region 42 illustrated in FIG. 9D also applies here.

Figure 11:
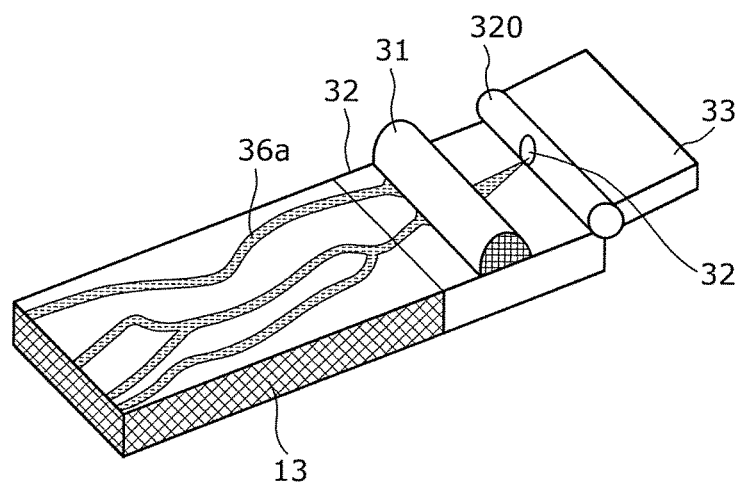
FIG. 11 illustrates an exemplary configuration of a supply port in Variation 1 of Embodiment 1.

For example, as illustrated in FIG. 11, one supply port 321 may be formed in the flow amount regulating unit 320. With this configuration, the upper limit of the flow amount of the liquid passing through the introduction channel 33 can be set to a certain flow amount, so that the flow speed is reduced before supplying the liquid to the supply channel 32.

Figure 12A:
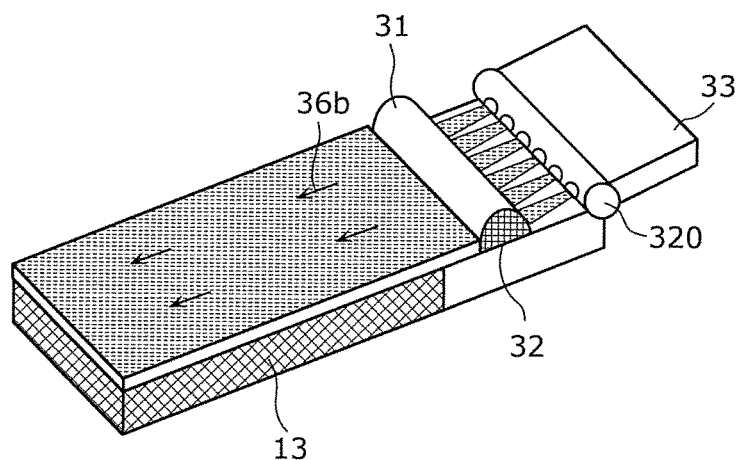
FIG. 12A illustrates an exemplary configuration of the supply port in Variation 1 of Embodiment 1.
Figure 12B:
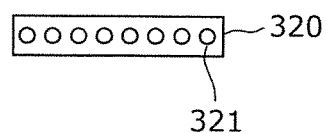
FIG. 12B illustrates an exemplary configuration of the supply port in Variation 1 of Embodiment 1.

Also, as illustrated in FIG. 12B, for example, the supply port 321 may be formed as a plurality of openings arranged perpendicularly to the flow direction of the liquid.

With this configuration, the upper limit of the flow amount of the liquid passing through the introduction channel 33 can be set to a certain flow amount, so that the flow speed is reduced before supplying the liquid to the supply channel 32. Furthermore, as illustrated in FIG. 12A, the liquid can be supplied from the plurality of supply ports 321 to the supply channel 32. Thus, after the liquid passes through (climbs over) the liquid speed reduction part 31, a substantially constant amount of the liquid can be supplied to the water tank 11A regardless of the position in the supply channel 32. Conceptually, the liquid can be introduced from the supply channel 32 to the water tank 11A in a planar manner. In other words, the liquid having a substantially constant energy can be introduced regardless of the position in the water tank 11A (the water-repellent particle layer 13). Moreover, it is possible to suppress local erosion of the water-repellent particle layer 13.

Especially when starting introducing the liquid to an empty water tank 11A, the supply of the liquid through a small number of the supply ports 321 reduces the water amount of the liquid flowing in the introduction channel 33 and the supply channel 32. Accordingly, the amount of the flowing liquid may sometimes vary depending on the position in the supply channel 32. At this time, as illustrated in FIG. 11, the liquid does not flow over the entire surface of the supply channel 32, but is supplied to the water tank 11A while flowing through a plurality of water passages and flows in the water tank 11A. As a result, a portion where the liquid layer is formed and a portion where no liquid layer is formed are present on the upper surface of the water-repellent particle layer 13.

Due to the presence of the portion where no liquid flows and the portion where the liquid flows, the water-repellent particle layer 13 is not eroded in the portion where no liquid flows, whereas the water-repellent particle layer 13 is eroded in the portion where the liquid flows. Consequently, the difference in height of the surfaces caused by the erosion of the water-repellent particle layer 13 is likely to increase compared with the case in which the liquid layer is formed on the entire upper surface of the water-repellent particle layer 13.

Thus, when the supply ports 321 have the same size as illustrated in FIG. 12A, by increasing the number of the supply ports 321, it becomes possible to reduce the difference in height of the surfaces of the water-repellent particle layer 13 caused by the erosion of the water-repellent particle layer 13 even at the start of introducing the liquid to the water tank 11A.

The supply ports 321 may be provided near the two side walls 32a and near the center in the supply channel 32. This increases the possibility that the liquid can be made to flow across the entire width of the supply channel 32, so that the difference in height of the surfaces of the water-repellent particle layer 13 caused by the erosion of the water-repellent particle layer 13 can be reduced further.

Figure 13A:
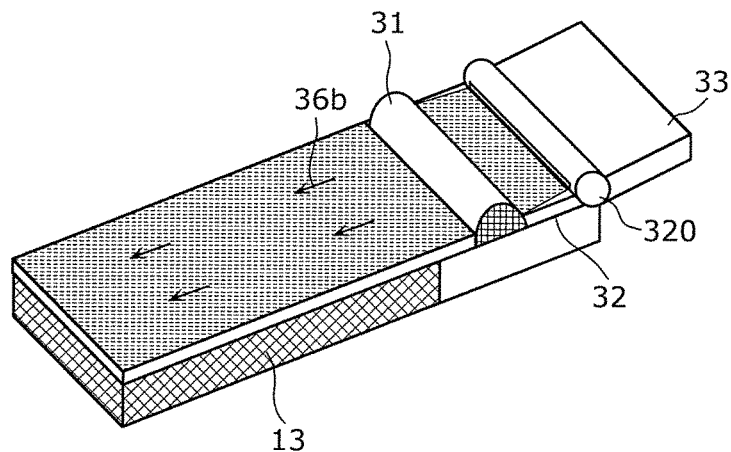
FIG. 13A illustrates an exemplary configuration of the supply port in Variation 1 of Embodiment 1.
Figure 13B:
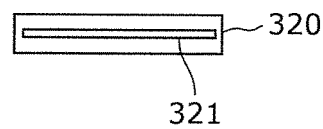
FIG. 13B illustrates an exemplary configuration of the supply port in Variation 1 of Embodiment 1.

Also, as illustrated in FIG. 13B, for example, the supply port 321 may be formed as a slit-shaped opening arranged perpendicularly to the flow direction of the liquid.

With this configuration, the upper limit of the flow amount of the liquid passing through the introduction channel 33 can be set to a certain flow amount, so that the flow speed is reduced before supplying the liquid to the supply channel 32. Furthermore, as illustrated in FIG. 13A, since the liquid is supplied to the liquid speed reduction part 31 in a linear or planar manner, the liquid that has passed through (climbed over) the liquid speed reduction part 31 can be made to flow in a planar manner. In other words, in this case, since the flow speed of the liquid flowing in the introduction channel 33 is reduced before supplying the liquid to the supply channel 32 in a planar manner, it is possible to enhance the effect of suppressing the erosion of the water-repellent particle layer 13.

(Variation 2)

The present variation is directed to an example different from Variation 1

Figure 14:
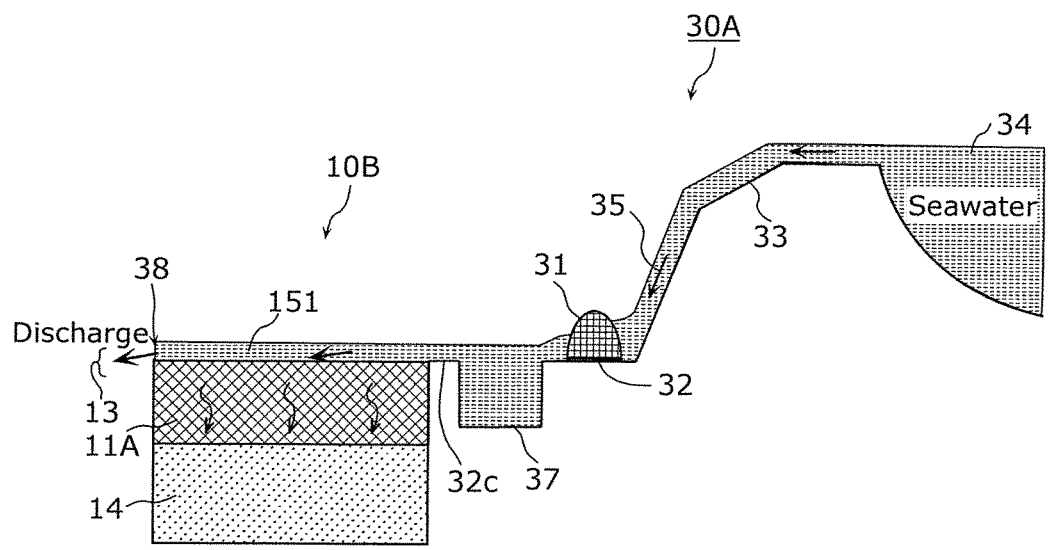
FIG. 14 is a sectional view illustrating an exemplary configuration of a desalination system in Variation 1 of Embodiment 1.
Figure 15A:
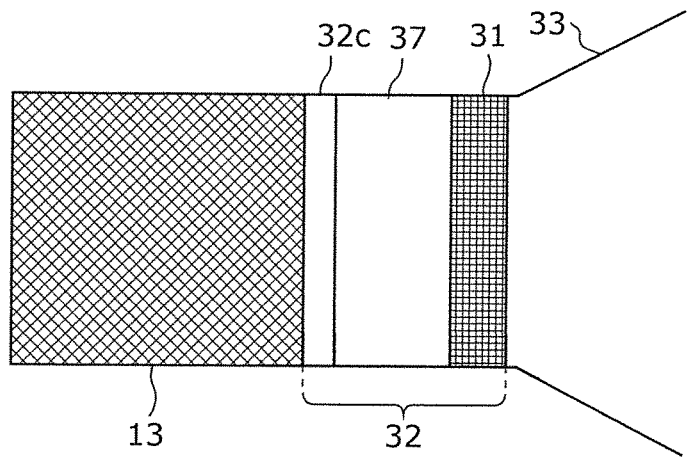
FIG. 15A illustrates an example of how to install a liquid speed reduction part in Variation 2 of Embodiment 1.
Figure 15B:
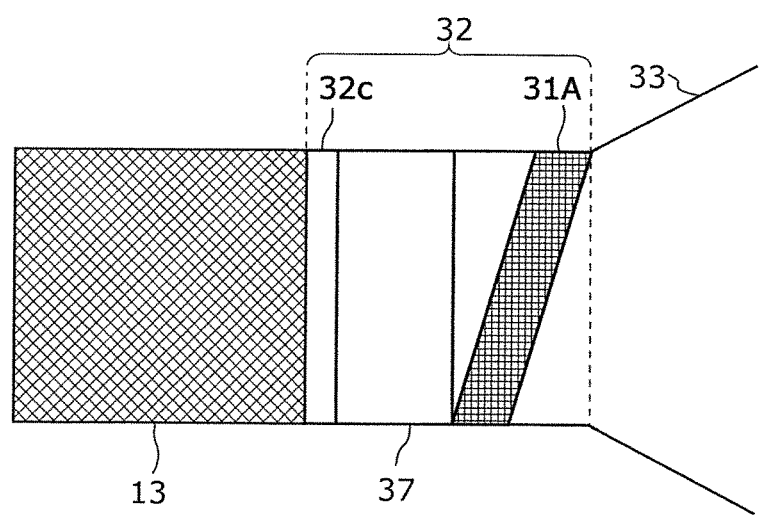
FIG. 15B illustrates an example of how to install the liquid speed reduction part in Variation 2 of Embodiment 1.

FIG. 14 is an example of the sectional view illustrating the configuration of a desalination system in Variation 2 of Embodiment 1. FIGS. 15A and 15B illustrate examples of how to install the liquid speed reduction part in Variation 2 of Embodiment 1.

The present variation provides a pool tank in the supply channel 32 between a desalination apparatus 10B and the liquid speed reduction part 31, thereby reducing the flow speed of the liquid flowing in the supply channel 32.

A desalination system 30A illustrated in FIG. 14 includes the desalination apparatus 10B, the liquid speed reduction part 31 and a pool tank 37.

The pool tank 37 is located in the supply channel 32 between the desalination apparatus 10B and the liquid speed reduction part 31, and includes an opening that is provided so as to span the channel width (passage width) of the supply channel 32 and a space in which the liquid introduced via the opening is accumulated and through which an overflow of the liquid is discharged to the supply channel 32 (more specifically, a supply channel 32c).

With this configuration, the liquid that has passed through (climbed over) the liquid speed reduction part 31 is further accumulated in the pool tank 37, and the overflow is discharged to the supply channel 32c. In this way, the liquid can be introduced at a gentle flow speed to the vicinity of the portion immediately below the water tank 11A (the liquid introduction position) connected with the supply channel 32c. This makes it possible to suppress the erosion of the water-repellent particle layer 13.

Here, the liquid speed reduction part 31 is provided at a position spanning the entire channel width (passage width) of the supply channel 32, similarly to the configuration illustrated in FIGS. 9A and 9B. More specifically, for example, as illustrated in FIG. 15A, the liquid speed reduction part 31 may be provided upstream of the pool tank 37 on the supply channel 32 along the direction perpendicular to the flow direction of the liquid in the supply channel 32 so as to span the channel width (passage width) of the supply channel 32, thereby blocking the flowing liquid. Alternatively, for example, as illustrated in FIG. 15B, a liquid speed reduction part 31A may be provided upstream of the pool tank 37 on the supply channel 32 along the direction crossing the flow direction of the liquid in the supply channel 32 so as to span the channel width (passage width) of the supply channel 32, thereby blocking the flowing liquid As described above, with the present variation, the pool tank 37 is provided, thereby further reducing the flow speed of the liquid flowing in the supply channel 32 after passing through (climbing over) the liquid speed reduction part 31 and then supplying the liquid to the water tank 11. Thus, it is possible to enhance the effect of suppressing the erosion of the water-repellent particle layer 13.

Figure 16:
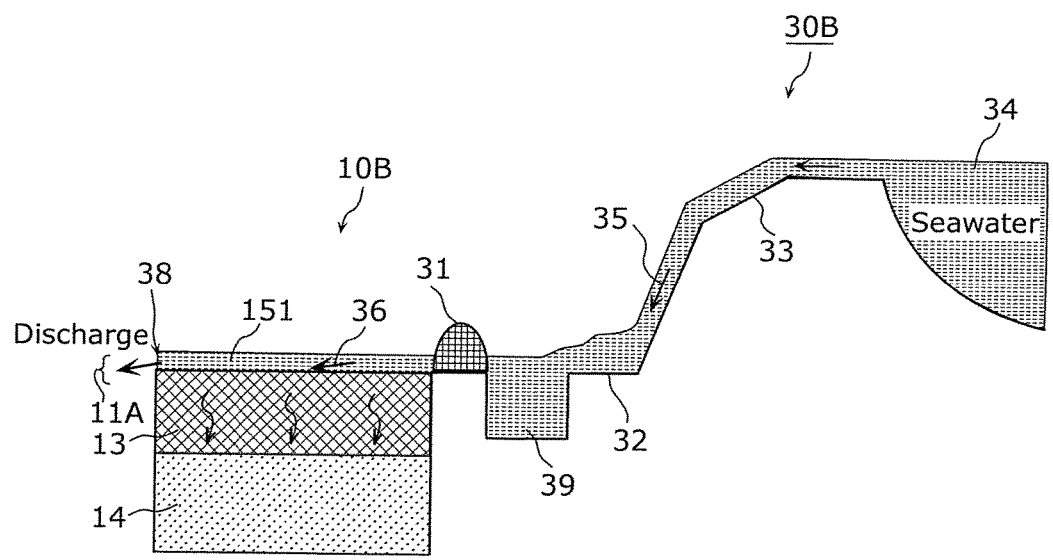
FIG. 16 is another example of the sectional view illustrating a configuration of a desalination system in Variation 2 of Embodiment 1.

Although the present variation has been directed to the example of providing the pool tank in the supply channel 32 between the desalination apparatus 10B and the liquid speed reduction part 31, there is no particular limitation to this. As illustrated in FIG. 16, the pool tank may be provided upstream of the liquid speed reduction part 31 in the supply channel 32, and include an opening that is provided so as to span the channel width (passage width) of the supply channel 32 and a space in which the liquid introduced via the opening is accumulated and from which an overflow of the liquid is discharged to the supply channel 32. Here, FIG. 16 illustrates another example of the sectional view illustrating a configuration of a desalination system 30B in Variation 2 of Embodiment 1.

(Variation 3)

Now, as the desalination process using the desalination apparatuses 10 and 10A described in the basic configuration continues, the concentration of impurities dissolved in the liquid in the water tank 11 rises in some cases, so that the impurities may be deposited on the water-repellent particle layer 13. For example, when the liquid is seawater, with an increase in the seawater salinity, the concentration of the seawater in the water tank 11 rises to saturation salinity in some cases, so that salt may be deposited on the water-repellent particle layer 13. In such cases, the distillation efficiency decreases.

Also, when impurities are originally mixed in the liquid stored in the water tank 11, the distillation (desalination) of the liquid causes precipitates of these impurities to be deposited on the water-repellent particle layer 13, leading to a reduced distillation efficiency.

In contrast, in Embodiment 1, Variations 1 and 2, the discharge port 38 is provided in the water tank 11A. In this way, the liquid in the water tank 11A gradually flows in the direction from the supply channel 32 to the discharge port 38 and discharged, thus making it possible to suppress the increase in the impurity concentration.

The present variation illustrates an example in which, not only is the discharge port described in Embodiment 1, Variation 1 and Variation 2 provided, but also the upper surface of the water-repellent particle layer is inclined so that the liquid constantly flows above the water-repellent particle layer, thereby preventing the precipitates from staying above the water-repellent particle layer.

Figure 17:
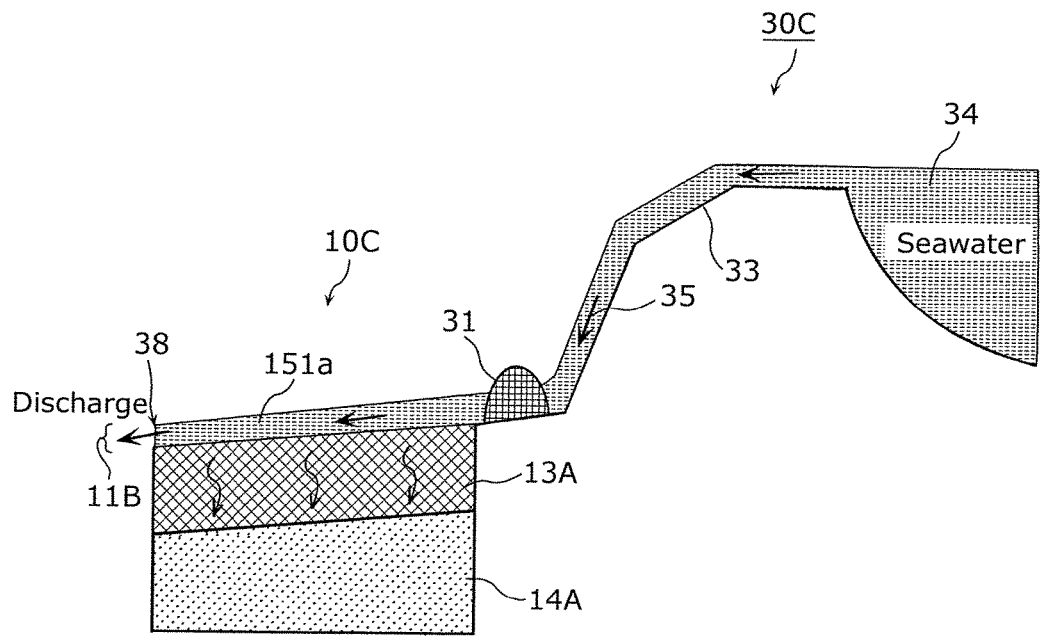
FIG. 17 is an example of the sectional view illustrating a configuration of a desalination system in Variation 3 of Embodiment 1.

FIG. 17 is an example of the sectional view illustrating a configuration of a desalination system 30C in Variation 3 of Embodiment 1. Structural elements similar to those in FIGS. 3 and 8A to 8D are assigned the same reference signs, and the detailed description thereof will be omitted.

The desalination system 30C illustrated in FIG. 17 includes the desalination apparatus 10C and the liquid speed reduction part 31.

The desalination apparatus 10C is different from the desalination apparatus 10B illustrated in FIG. 8A in the configuration of a water tank 11B, a water-repellent particle layer 13A and a liquefying layer 14A.

More specifically, the water tank 11B has a space for storing the liquid, and is inclined in such a manner as to descend from the introduction channel 33 toward the discharge port 38 with respect to a plane perpendicular to the gravitational direction. Since other configurations are similar to those of the water tank 11A, the description thereof will be omitted.

The water-repellent particle layer 13A has an inclined upper surface descending from the introduction channel 33 toward the discharge port 38 with respect to the plane perpendicular to the gravitational direction. In the present embodiment, the water-repellent particle layer 13 has an inclined lower surface descending from the introduction channel 33 toward the discharge port 38 with respect to the plane perpendicular to the gravitational direction. Incidentally, in order to incline the water tank 11B, only the upper surface of the water-repellent particle layer 13A needs to be inclined. Furthermore, by inclining the lower surface of the water-repellent particle layer 13A as well, it becomes possible to form the water-repellent particle layer 13A with a uniform thickness, leading to easier formation of the water-repellent particle layer 13A. Since other configurations are similar to those of the water-repellent particle layer 13, the description thereof will be omitted.

The liquefying layer 14A is formed in such a manner as to have a upper surface parallel with the lower surface of the water-repellent particle layer 13A. Since other configurations are similar to those of the liquefying layer 14, the description thereof will be omitted.

With this configuration, the liquid can be supplied from upstream so as to keep forcing out the desalinated (distilled) liquid. In other words, it is possible to cause the liquid above the water-repellent particle layer 13A (the water tank 11B) to flow constantly, thus preventing the precipitates from staying above the water-repellent particle layer. This helps to suppress the reduction in the distillation efficiency.

Although the gradient of the above-noted inclination may take any value, for example, greater than or equal to 0.1, which is the gradient allowing the liquid to flow naturally, it is not limited to this. The gradient is appropriate as long as it allows the liquid in the water tank 11B to flow constantly.

Additionally, an inclined surface of the above-noted inclination may be formed so as to receive sunlight efficiently. For example, the inclined surface may be formed to face the south in the Northern Hemisphere, and formed to face the north in the Southern Hemisphere.

As described above, with the desalination system and the desalination method according to one aspect of the present disclosure, the liquid can be introduced at a gentle flow speed to the vicinity of the portion immediately below the water tank connected with the introduction channel (the liquid introduction position), making it possible to suppress the erosion of the water-repellent particle layer. Thus, the problem of desalination being impossible can be alleviated.

Although the desalination system and the desalination method according to one or more aspects of the present disclosure have been described above based on an embodiment, the present disclosure is by no means limited to this embodiment. As long as not departing from the purport of the present disclosure, many variations of the above embodiment conceivable by a person skilled in the art and modes configured by the combination of the structural components in different embodiments may be included in the scope of one or more aspects of the present disclosure.

For example, the desalination system according to Embodiment 1 may include the sluice gate provided in the desalination system with the basic configuration illustrated in FIG. 4, or may include the sluice gate, the sluice gate control unit, the drain pipe and the discharge valve, etc. provided in the desalination system with the basic configuration illustrated in FIG. 6. Likewise, a partial aspect of the desalination system described in the basic configuration may be combined freely with the desalination system in Embodiment 1.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The desalination system and the desalination method according to one or more exemplary embodiments disclosed herein are applicable to a desalination system and a desalination method that desalinate seawater or distill a liquid by removing impurities that may be deposited as salt.

The invention claimed is:

1. A desalination system comprising:
a water tank;
a water-repellent particle layer that is located below the water tank and contains a plurality of water-repellent particles;
a plurality of particles forming a liquefying layer that is located below the water-repellent particle layer and liquefies water vapor that has passed through the water-repellent particle layer, to obtain fresh water;
an introduction channel that supplies a liquid to the water tank;
a liquid speed reduction part that is located on the introduction channel, and includes a wall surface crossing a flow direction of the liquid in the introduction channel, for reducing a flow speed of the liquid; and
a pool tank located in the introduction channel between the water tank and the liquid speed reduction part, the pool tank having an opening that spans a channel width of the introduction channel, and a space in which the liquid introduced via the opening is accumulated and from which an overflow of the liquid is discharged to the introduction channel.

2. The desalination system according to claim 1, wherein the wall surface is of a sufficient width to span an entire channel width of the introduction channel.

3. The desalination system according to claim 1, further comprising
wherein the pool tank is located upstream of the liquid speed reduction part in the introduction channel.

4. The desalination system according to claim 1, wherein the introduction channel has at least a predetermined length between the water tank and the liquid speed reduction part.

5. The desalination system according to claim 1, wherein the liquid speed reduction part has a semi-cylindrical shape.

6. The desalination system according to claim 1, wherein the liquid speed reduction part has a rectangular parallelepiped shape.

7. The desalination system according to claim 1,
wherein the liquid speed reduction part has a triangular prismatic shape having different base angles, and
one of the base angles is smaller than another of the base angles on an opposite side of the liquid speed reduction part.

8. The desalination system according to claim 1, further comprising a supply port that supplies the liquid from outside of the desalination system to the introduction channel, wherein the supply port has a slit shape.

9. The desalination system according to claim 1, further comprising a supply port that supplies the liquid from outside of the desalination system to the introduction channel, wherein the supply port includes a plurality of openings.

10. The desalination system according to claim 1, further comprising a sluice gate that is opened and closed to start and stop introducing the liquid from outside of the desalination system to the introduction channel.

11. A desalination system comprising:
a water tank;
a water-repellent particle layer that is located below the water tank and contains a plurality of water-repellent particles;
a plurality of particles forming a liquefying layer that is located below the water-repellent particle layer and liquefies water vapor that has passed through the water-repellent particle layer, to obtain fresh water;
an introduction channel that supplies a liquid to the water tank;
a liquid speed reduction part that is located on the introduction channel, and includes a wall surface crossing a flow direction of the liquid in the introduction channel, for reducing a flow speed of the liquid,
wherein the water tank is connected with the introduction channel, and provided with a discharge channel through which the liquid is discharged partially, the discharge channel being located at a position opposed to the introduction channel with the water tank interposed between the introduction channel and the discharge channel, and
the water-repellent particle layer has an inclined upper surface descending from the introduction channel toward the discharge channel with respect to a plane perpendicular to a gravitational direction.

12. The desalination system according to claim 11, wherein the water-repellent particle layer has an inclined lower surface descending from the introduction channel toward the discharge channel with respect to the plane perpendicular to the gravitational direction.

13. A desalination method for obtaining fresh water from a liquid using a desalination system, the desalination system including:
a water tank to which the liquid is introduced;
a lid that is disposed on an opening of the water tank;
a water-repellent particle layer that is located below the water tank and contains a plurality of water-repellent particles;
a plurality of particles forming a liquefying layer that is located below the water-repellent particle layer;
an introduction channel that introduces the liquid to the water tank;
a liquid speed reduction part that is located on the introduction channel, and includes a wall surface crossing a flow direction of the liquid in the introduction channel, for reducing a flow speed of the liquid, and
a pool tank located in the introduction channel between the water tank and the liquid speed reduction part, the pool tank having an opening that spans a channel width of the introduction channel, and a space in which the liquid introduced via the opening is accumulated and from which an overflow of the liquid is discharged to the introduction channel,
the desalination method comprising:
introducing the liquid via the introduction channel to the water tank and placing the liquid above the water-repellent particle layer;
heating and evaporating the liquid placed above the water-repellent particle layer to obtain water vapor; and
liquefying the water vapor by the liquefying layer to obtain the fresh water.

14. A desalination method for obtaining fresh water from a liquid using a desalination system, the desalination system including:
a water tank to which the liquid is introduced;
a lid that is disposed on an opening of the water tank;
a water-repellent particle layer that is located below the water tank and contains a plurality of water-repellent particles;
a plurality of particles forming a liquefying layer that is located below the water-repellent particle layer;
an introduction channel that introduces the liquid to the water tank; and
a liquid speed reduction part that is located on the introduction channel, and includes a wall surface crossing a flow direction of the liquid in the introduction channel, for reducing a flow speed of the liquid,
wherein the water tank is connected with the introduction channel, and provided with a discharge channel through which the liquid is discharged partially, the discharge channel being located at a position opposed to the introduction channel with the water tank interposed between the introduction channel and the discharge channel, and
the water-repellent particle layer has an inclined upper surface descending from the introduction channel toward the discharge channel with respect to a plane perpendicular to a gravitational direction, the desalination method comprising:
introducing the liquid via the introduction channel to the water tank and placing the liquid above the water-repellent particle layer;
heating and evaporating the liquid placed above the water-repellent particle layer to obtain water vapor; and
liquefying the water vapor by the liquefying layer to obtain the fresh water.

* * * * *